Figure 1:
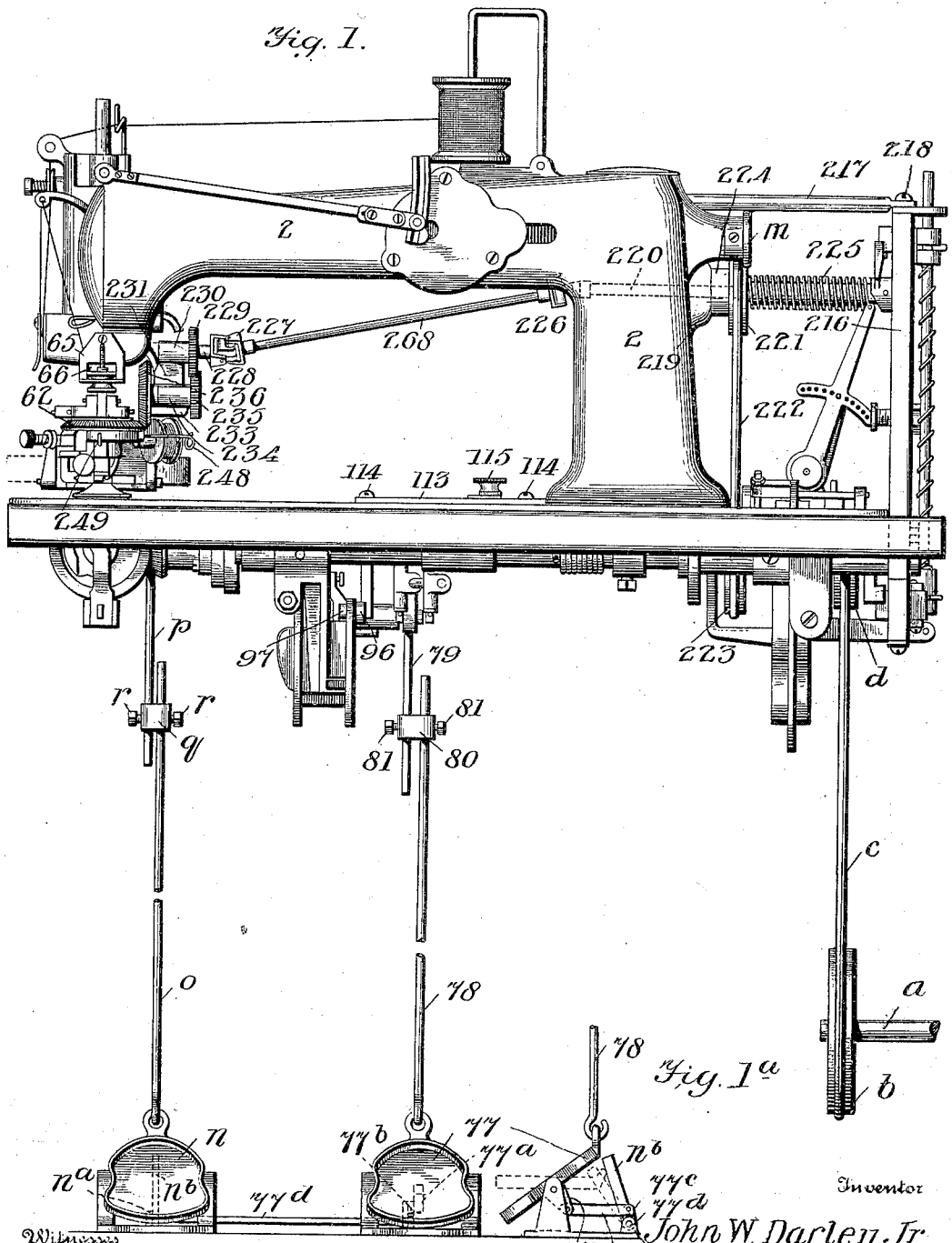

No. 747,048. PATENTED DEC. 15, 1903.
J. W. DARLEY, Jr.
BUTTON SEWING MACHINE.
APPLICATION FILED MAR. 28, 1903.
NO MODEL. 10 SHEETS—SHEET 4.

Witnesses
Jao. H. Byrne
Fred W. Englert

Inventor
John W. Darley Jr.
By Wilkinson
& Fisher,
Attorneys

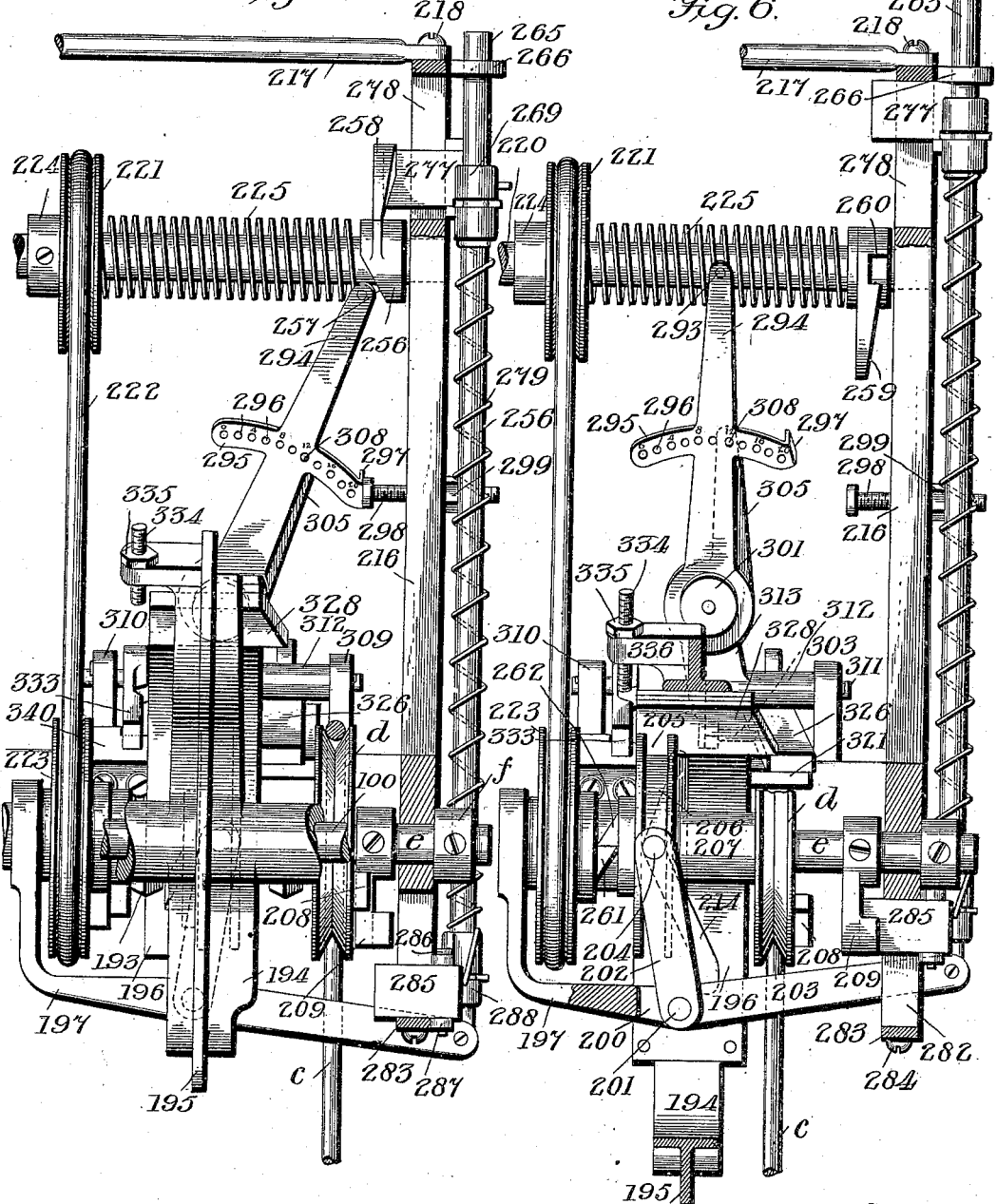

No. 747,048. PATENTED DEC. 15, 1903.
J. W. DARLEY, Jr.
BUTTON SEWING MACHINE.
APPLICATION FILED MAR. 28, 1903.
NO MODEL. 10 SHEETS—SHEET 6.
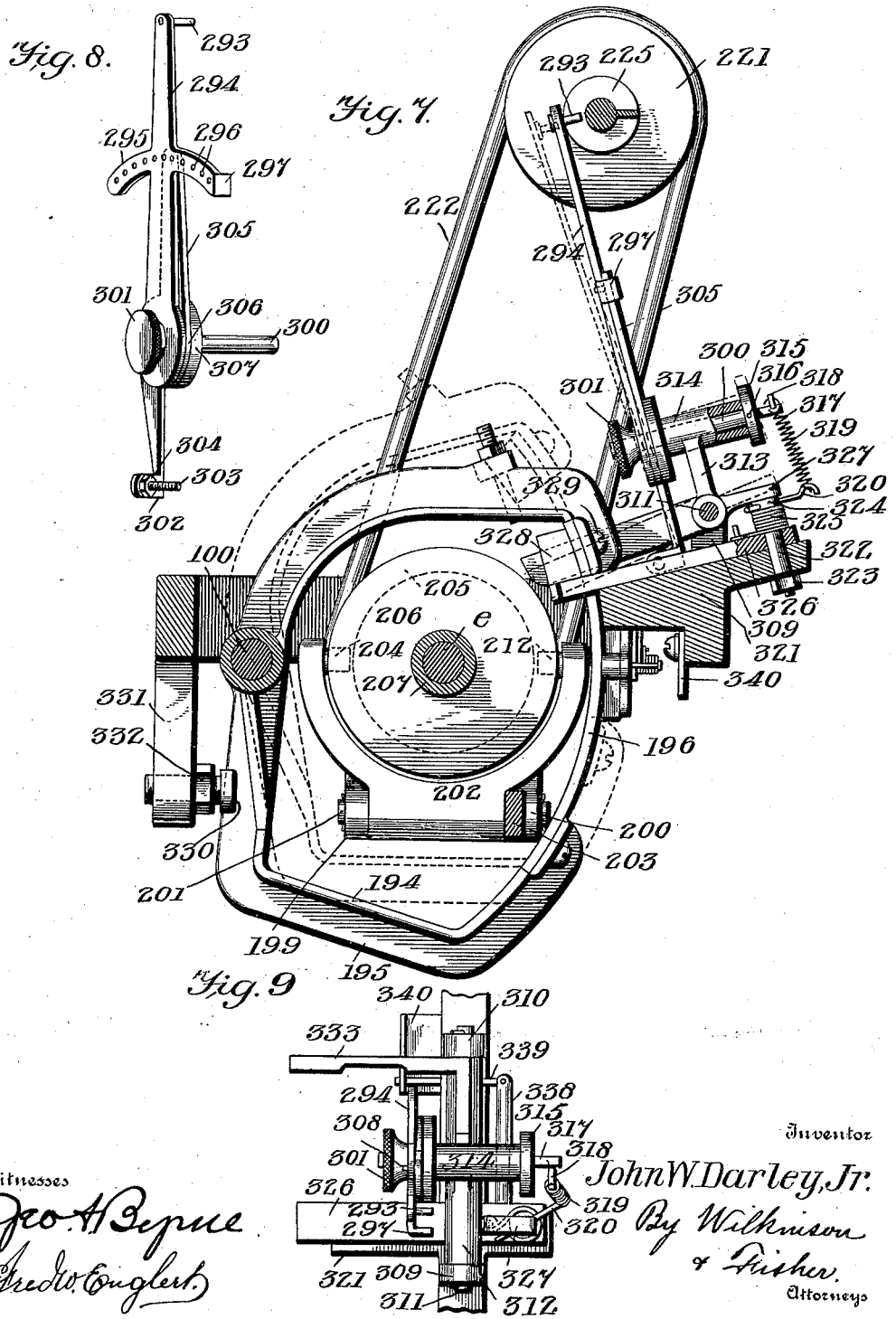

No. 747,048. PATENTED DEC. 15, 1903.
J. W. DARLEY, Jr.
BUTTON SEWING MACHINE.
APPLICATION FILED MAR. 28, 1903.
NO MODEL. 10 SHEETS—SHEET 7.
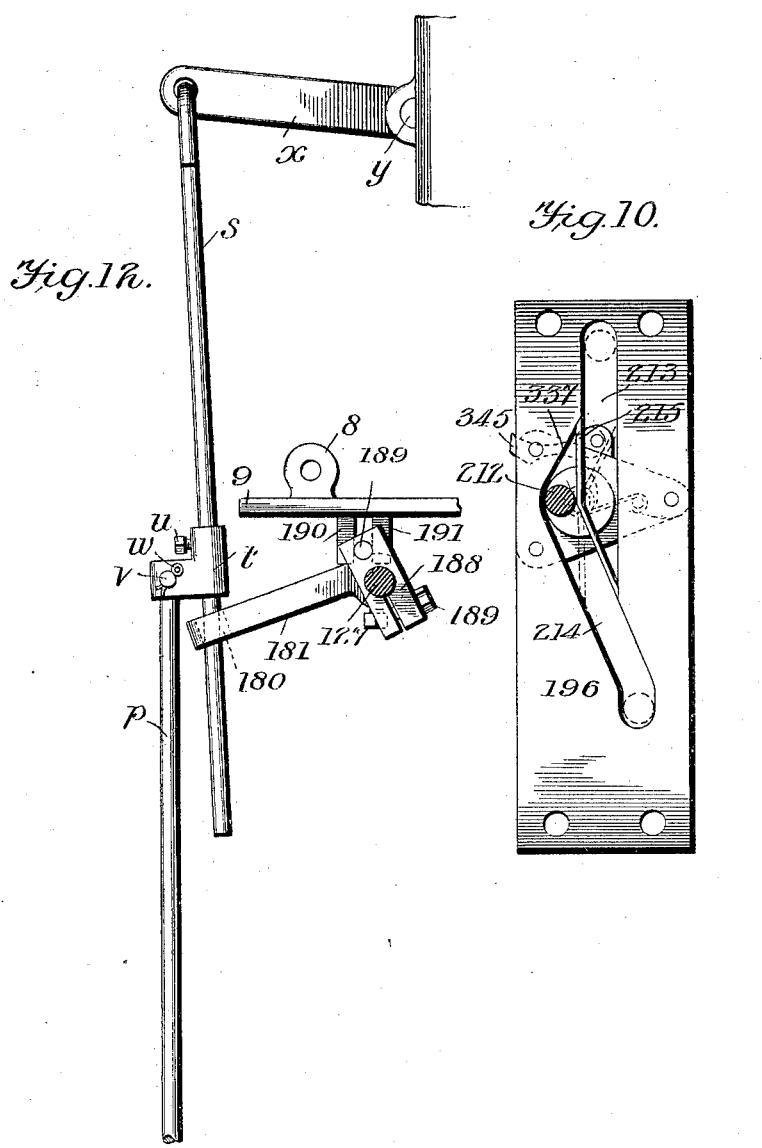

No. 747,048. PATENTED DEC. 15, 1903.
J. W. DARLEY, Jr.
BUTTON SEWING MACHINE.
APPLICATION FILED MAR. 28, 1903.
NO MODEL. 10 SHEETS—SHEET 8.
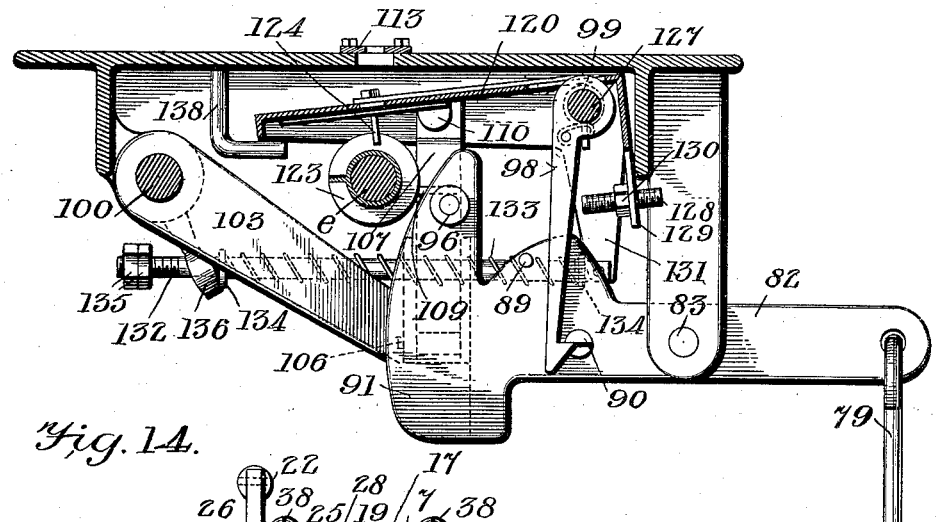
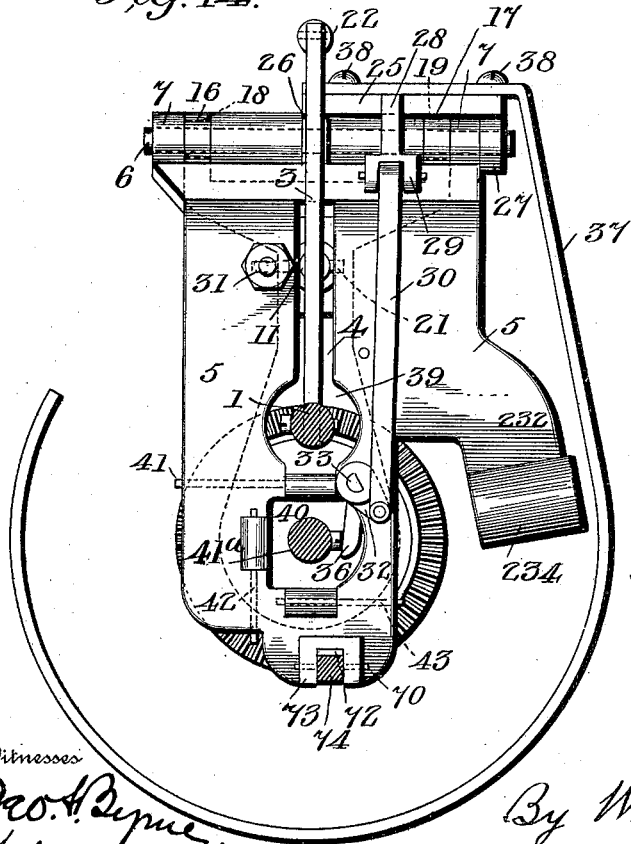
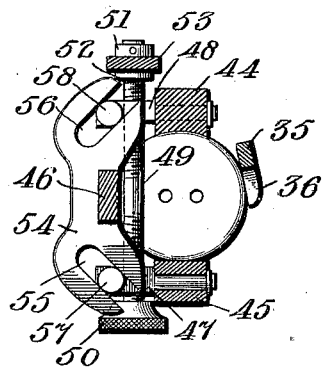
Inventor
John W. Darley, Jr.
By Wilkinson & Fisher,
Attorneys
Witnesses No. 747,048. PATENTED DEC. 15, 1903.
J. W. DARLEY, Jr.
BUTTON SEWING MACHINE.
APPLICATION FILED MAR. 28, 1903.
NO MODEL. 10 SHEETS—SHEET 9.
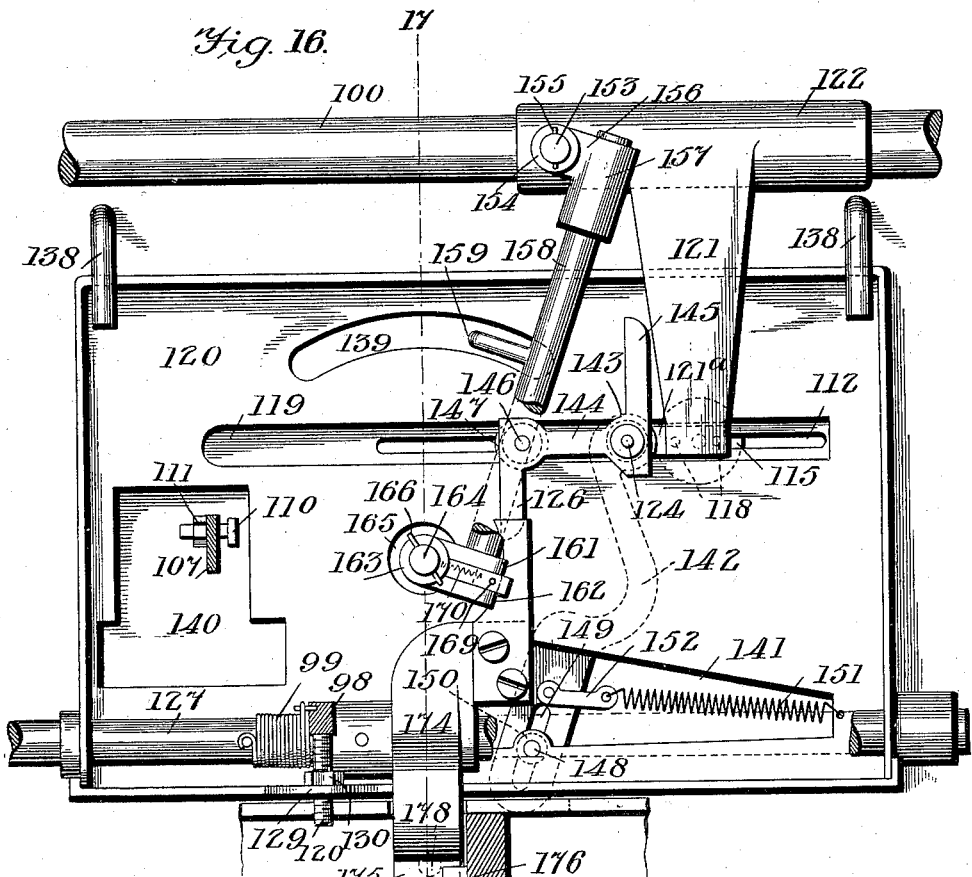
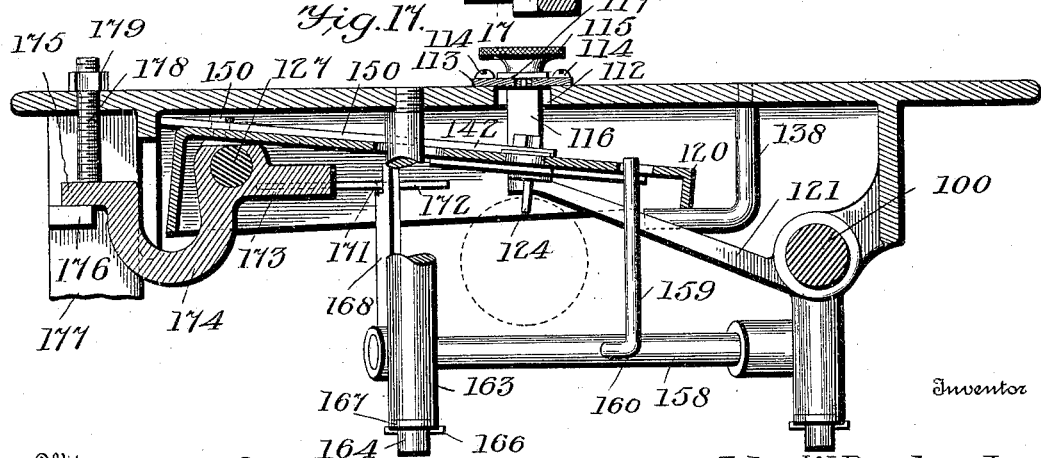
Witnesses
Geo. H. Depue
Fred W. Englert
Inventor
John W. Darley, Jr.
By Wilkinson & Fisher
Attorneys No. 747,048. PATENTED DEC. 15, 1903.
J. W. DARLEY, Jr.
BUTTON SEWING MACHINE.
APPLICATION FILED MAR. 28, 1903.
NO MODEL. 10 SHEETS—SHEET 10.
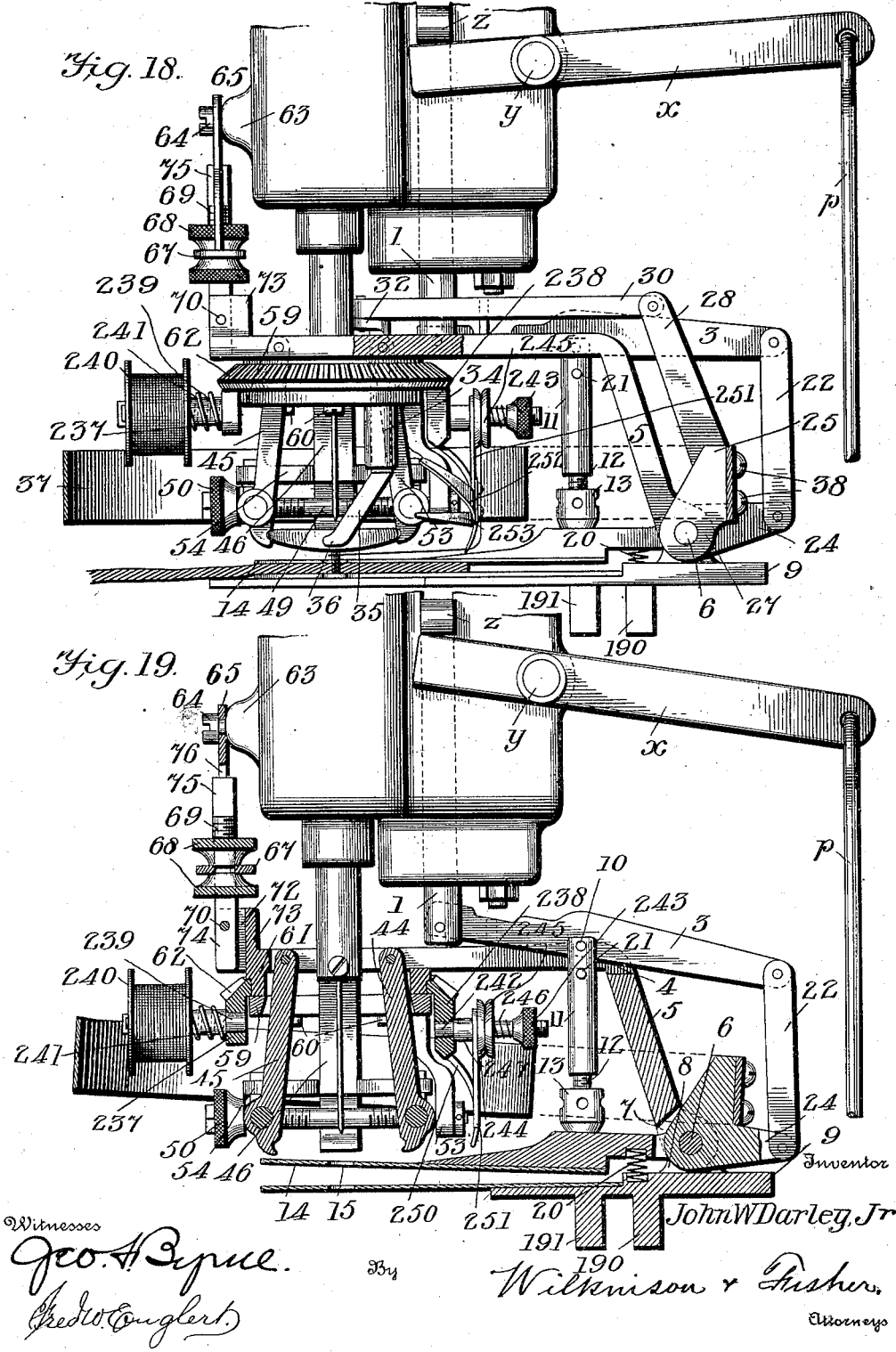
Witnesses
Geo. H. Pyne.
Fred W. Englert.
Inventor
John W. Darley, Jr.
By Wilkinson & Fisher,
Attorneys No. 747,048. Patented December 15, 1903.

UNITED STATES PATENT OFFICE.

JOHN W. DARLEY, JR., OF BALTIMORE, MARYLAND.

BUTTON-SEWING MACHINE.

SPECIFICATION forming part of Letters Patent No. 747,048, dated December 15, 1903.

Application filed March 28, 1903. Serial No. 149,996. (No model.)

*To all whom it may concern:*

Be it known that I, JOHN WESLEY DARLEY, Jr., a citizen of the United States, residing at Baltimore, in the State of Maryland, have invented certain new and useful Improvements in Button-Sewing Machines; and I do hereby declare the following to be a full, clear, and exact description of the invention, such as will enable others skilled in the art to which it appertains to make and use the same.

My invention relates to machines for sewing buttons on garments or other fabrics; and the object of my invention is to provide a machine which will sew buttons on garments in exact imitation of hand-sewing—namely, with the buttons separated from the garments by a neck of thread, around which neck another thread is wrapped, thus securing the buttons to the garments at a distance therefrom. Such a machine has hitherto never been made, so far as I am aware.

Hitherto in all button-sewing machines the button has been sewed on close to the garment, making it difficult to button the garments, causing undue strain upon the buttons, and wearing out the buttonholes quickly. These objections have prevented such machines from going into general use, and they are now used only on the cheaper kinds of garments. By my invention, however, these objections are all removed and the buttons can be sewed on garments with great speed and in fully as good a manner as is accomplished by hand-sewing.

With the objects above stated in view my invention consists in the construction and combinations of parts, as hereinafter described and claimed.

Figure 2:
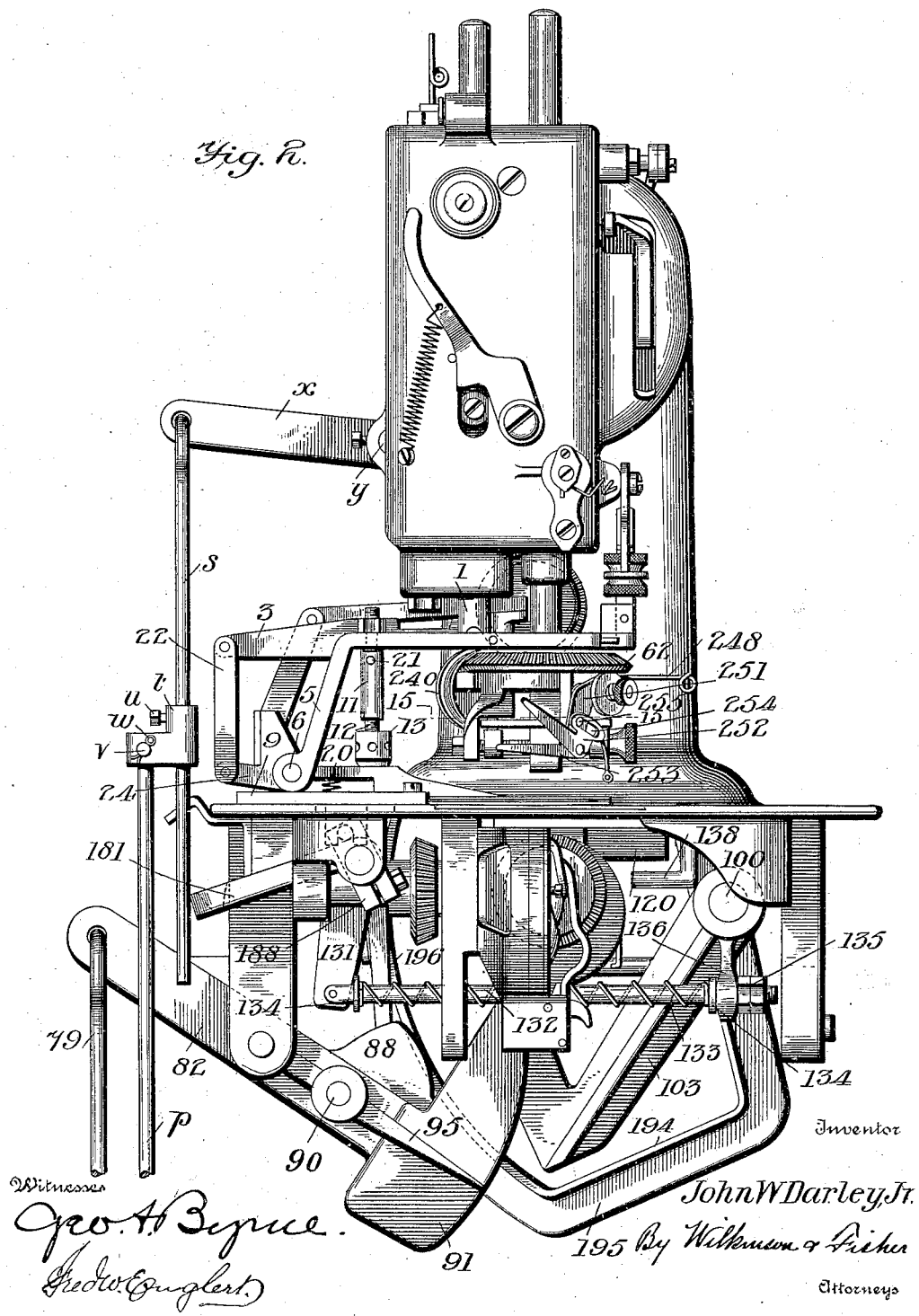
Figure 3:
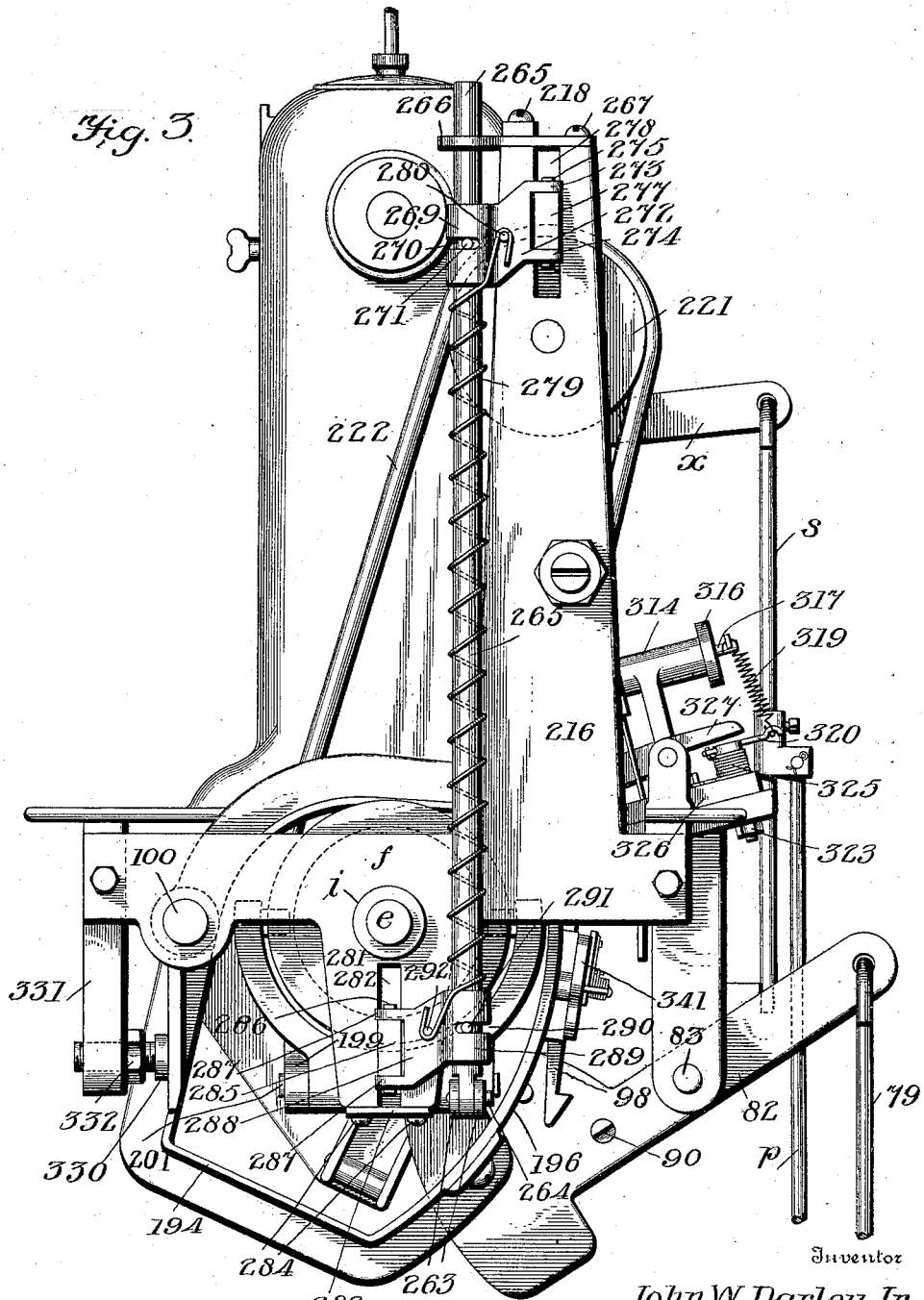
Figure 4:
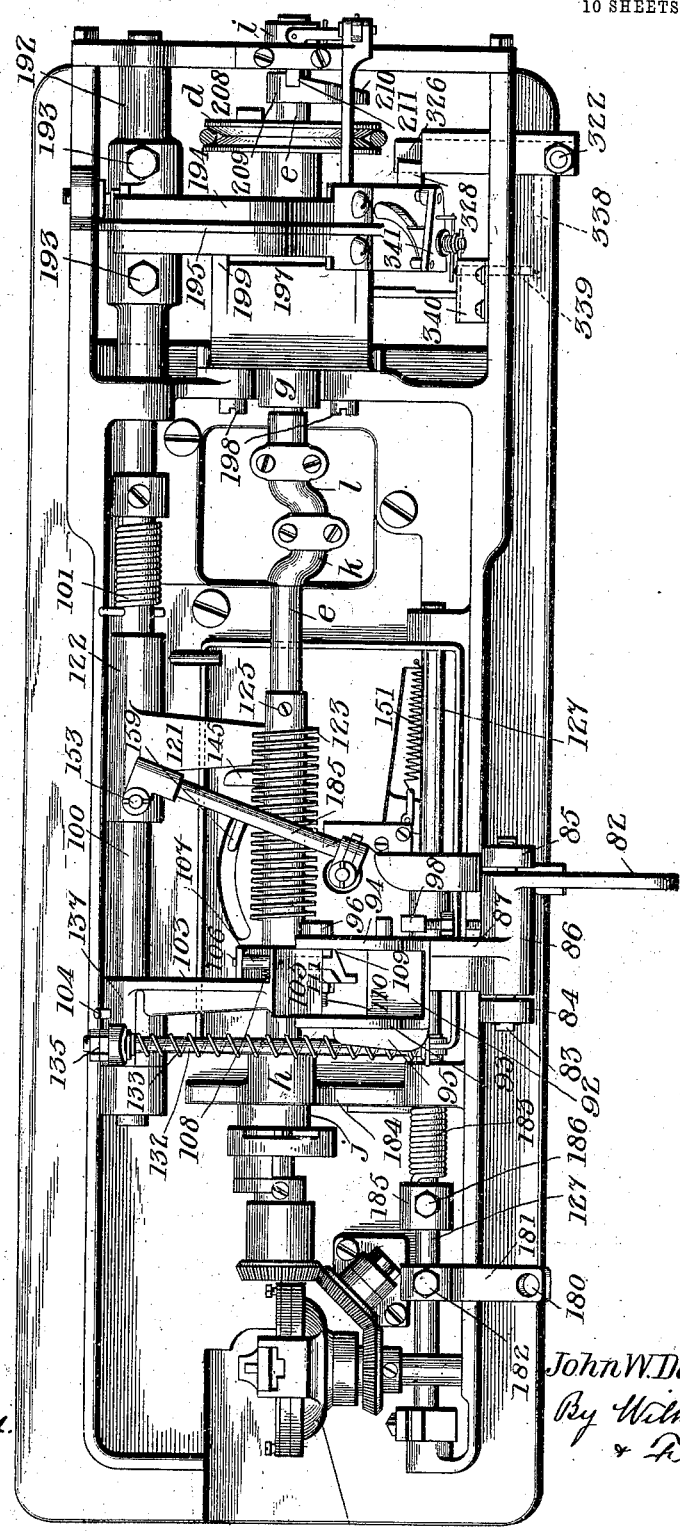

In the accompanying drawings, which illustrate one embodiment of my invention, Figure 1 is a front elevation of a complete machine for sewing buttons on garments. Fig. 1ª is a side view of the treadle attachment. Fig. 2 is an end view of the same from the needle end. Fig. 3 is an end view from the opposite or power end. Fig. 4 is a bottom plan view. Fig. 5 is an enlarged view of the index-shaft of the winding mechanism and related parts. Fig. 6 is a view of the same in a different position, showing the parts in the positions they occupy as the winding of the neck of the button is completed. Fig. 7 is an end view of the parts shown in Figs. 5 and 6, some of the parts being shown in section and others removed. Fig. 8 is a perspective view of the winder index-lever. Fig. 9 is a plan view of the winder index-lever, winder-stop and related parts. Fig. 10 is a front view of the cam and switch looking from the front of the machine. Fig. 11 is a similar view looking from the back of the machine. Fig. 12 is a side view of the operating mechanism joined to the left-hand treadle of Fig. 1 as arranged when a four-hole button is used. Fig. 13 shows the rod attached to the right-hand treadle of Fig. 1 and the parts connected thereto in the position they assume after the machine is started. Fig. 14 is a plan view, partly in section and with parts omitted, of the button chuck and guard. Fig. 15 is a plan view, partly in section, of the button-chuck, the section being taken on the line 15 15 of Fig. 2. Fig. 16 is a bottom plan view of the index-pan for the sewing mechanism, showing also the means for dividing the stitches equally between the two pairs of holes when a four-hole button is used. Fig. 17 is a cross-section of the same on the line 17 17 of Fig. 16. Fig. 18 is an enlarged end view, looking from the power end, showing the presser-bar down, the garment held thereby, and the button partially sewed on; and Fig. 19 is a similar view, partly in section, showing the presser-bar raised.

My improved machine can be run by treadle or by power. I prefer the latter, however, and have shown it in the particular form of my invention illustrated in the drawings. My machine operates equally well with either two-hole or four-hole buttons, and if the latter are used the machine automatically divides the number of stitches into two equal parts and causes one half of said stitches to pass through one pair of holes and the other half through the other pair of holes. By means of an adjustable index the desired number of stitches may be caused to pass through the holes of the button whether of the two-hole or four-hole variety. Similarly the winding mechanism for winding thread around the neck of thread securing the button to the garment may be adjusted to give any desired number of turns around the thread-neck, or it may be adjusted so that it will not wind any thread about the neck-thread when this is desired, as in the sewing of buttons on the ends of coat-sleeves. Furthermore, the mechanism is so arranged that when it is once properly adjusted at the start the operator cannot make a mistake. If the operator attempts, for example, to operate the treadles before the operation of attaching the previous button is completed, he is unable to do so before the completion of the previous operation of sewing and winding. All that the operator has to do is to put the garment under the presser foot or bar, feed the buttons, and operate the treadles at intervals. The machine does the rest.

In carrying out my invention I make use of the well-known vibrating-needle type of sewing-machine already in limited use for sewing on buttons. This is a well-known type, and the means for operating the needle, the shuttle, and related parts, and for adjusting the throw of the needle need not be described, as they are well known.

Referring to Fig. 1, $a$ designates a power-shaft having on it a pulley $b$, which by means of a cord or belt $c$ continuously drives a pulley $d$, loosely mounted on the shaft $e$. This shaft is mounted in bearings $f\ g\ h$ (see Fig. 4) on the underside of the machine, and shoulders $i\ j$ on either end thereof keep it in position and prevent it from moving longitudinally. This shaft has two cranked portions $k\ l$, which are arranged ninety degrees apart, so that a dead-center is always avoided. From these cranked portions run links (not shown) to similar cranked portions on the shaft which drives the needle. (Not shown.) This driving-shaft for the needle carries a hand-wheel $m$, (see Fig. 1,) used in the adjustment of the machine before starting it up.

Before the machine is started the garment or fabric should be placed beneath the presser-bar, the button-chuck opened, the button put in position, and the button-chuck closed. This is accomplished in the following manner, reference being made especially to Figs. 1, 2, 18, and 19: The left-hand treadle $n$ is moved down, carrying with it the rod $o$, which is attached thereto. This rod draws down with it the rod $p$, the two rods being adjustably secured together by the coupling $q$ and set-screws $r$. The downward movement of the rod $p$ causes a similar movement of the rod $s$, a coupling $t$ securing these two rods together. The coupling $t$ is secured to the rod $s$ by the set-screw $u$, and the rod $p$ is secured to the coupling $t$ by a pin $v$, held in place by a cotter-pin $w$. The upper end of the rod $s$ is loosely secured to the end of a lever $x$, which is pivoted at $y$ in the needle end of the gooseneck 2. The other end of the lever $x$ loosely engages the under side of a projection $z$ on the sliding bar 1, which bar, under the influence of gravity and a spring, (not shown,) tends to assume the position shown in Fig. 18, from which position it is moved into the position shown in Fig. 19 when the treadle $n$ is operated. This sliding bar 1 has pivoted to it the link 3, which link at times acts merely as a link and at other times as a lever. This link 3 is arranged to play up and down in a slot 4 in the casting 5, which carries the winding mechanism. This casting 5 is pivoted on a pin 6 by means of two ears 7. (See Fig. 14.) The pin 6 passes through a centrally-slotted projection 8, extending upwardly from a plate 9, supported on the bed-plate of the machine.

Loosely attached to the bar or lever 3 by the pin 10 is an upright bar 11, provided with a screw-thread 12 at its lower end, upon which screws a head 13 for the purpose of adjusting the length of the upward movement of the presser-bar 14, which is slotted at 15 for the passage of the needle and neck of thread after the button is attached to fabric. The presser-lever 14 is pivoted on the pin 6 by means of two perforated ears 16 and 17. Long washers 18 and 19 are placed within said ears and serve to keep the parts mounted on the pin 6 in their proper relative position, while permitting of a free motion of the presser-bar 14. A spring 20, mounted in seats in the plate 9 and the presser-lever 14, normally tends to raise the presser-lever, which it does whenever the bar 11 is raised. The bar 11 carries a second pin 21 a slight distance below the pin 10. When the bar 1 is lifted, carrying with it the bar 3, the bar 11 is also lifted by the action of the pin 10 and the spring 20 until the pin 21 comes in contact with the lower end of the screw 31. An adjusting-screw 31 (see Fig. 14) passes down through the plate 5 in proximity to the slot 4 and regulates the extent of upward movement of the pin 21 and bar 11, this adjustment being an additional adjustment to that obtained by the head 13, acting on the screw-threads 12. As soon as the pin 21 strikes the screw 31 the pin 10 acts as a fulcrum for the lever 3. Pivoted to the rear end of the lever 3 is a link 22, the lower end of which is pivoted to a projection 24 on a casting 25, which by means of ears 26 and 27 is pivoted on the pin 6. The perforated ear 26 is journaled on the center of the pin 6 between the portions of the vertical projection 8 of the plate 9.

At about the center of the casting 25 is formed an upwardly-projecting portion 28, in the perforated upper portion of which, 29, is pivoted one end of a link 30, the other end of which is pivoted to a short crank 32, which is firmly fastened to a vertical shaft 33 in any suitable way. This shaft 33 is carried in a long sleeve 34. (See Fig. 18.) The lower end of the shaft 33 is bent forwardly, as shown at 35, terminating in a toe 36, the inner side of which presses upon the edge of a button when the latter is placed in position to be sewed onto a garment or fabric.

The guard 37 is attached to the casting 25 by screws 38, and when the presser-bar is raised the guard is raised with it, as shown in Fig. 19. After the button is put in place the guard and the parts of the button-chuck assume the position shown in Fig. 18. By means of the connections described a pressure downwardly upon the treadle $n$ lifts the presser-lever, so that the fabric may be placed underneath, and swings the member 35 of the button-chuck outwardly and rearwardly, so that the button may be placed in the chuck.

The button-chuck is composed of four members, one of which, 35, has already been described. The other three members will now be described, reference being had more especially to Figs. 14, 15, 18, and 19. The casting 5, as already explained, has a slot 4. This slot is expanded, as shown at 39 and 40. In the latter slot the part shown in section in Fig. 14 and numbered $41^a$ is the needle-carrying bar. On three sides of the slot 40 pins 41, 42, and 43 are mounted in the plate or casting 5. On these are carried three jaws of the button-chuck 44, 45, and 46, each of which has a curved recess at its lower end for the reception of the button. (See Fig. 19.) The two jaws 44 and 45 are placed opposite each other, and each is provided with a screw-threaded boss, numbered 47 and 48 on Fig. 15. Through these bosses the screw 49 passes, provided with a head 50 and with right-hand and left-hand screw-threads. The movement of the head 50 causes the jaws 44 and 45 to approach each other at the same rate. The screw is held in its proper relative position in regard to the other parts of the machine by means of collars 51 and 52, which are located on said screw on either side of the perforated projection 53, which is firmly held by the plate 5, being indirectly fastened thereto.

The fourth clamp 46 of the button-chuck is provided with an extension 54, the ends of which are slotted, as shown at 55 and 56. These slotted ends engage with pins 57 and 58, projecting upwardly from the bosses 47 and 48. These slots are so arranged that the movement of the screw 49 to the right not only causes the jaws 44 and 45 to approach each other at the same rate, but it also causes jaw 46 to approach at the same rate, and by reason of the jaws being adjustably held in the same relation to the plate 5 buttons of various sizes are always properly adjusted, so that when the three jaws 44, 45, and 46 are screwed together to fit the button, and the fourth jaw 35 is brought inwardly to rest against the button, they will be centrally disposed with reference to the needle-bar center, as shown in Fig. 14. The projection 53 is an integral part of the ring 59, which by means of the screws 60 is attached to the ring 61, which is either made integral with the plate 5 or firmly attached thereto. The lower part of the ring 61 is provided with a circular groove, in which runs the annular beveled gear-wheel 62, forming a part of the winding mechanism, which will be hereinafter described. (See Fig. 19.)

Provision is made for the adjustment of the plate 5 in the following manner: Attached to a boss 63 on the needle end of the gooseneck 2, by means of a screw 64 is a plate 65. (See Figs. 1, 18, and 19.) This plate is provided with a horizontal slot 66 and a projecting perforated portion 67, in the hole of which is mounted the screw-rod 69, the longitudinal portion of which is adjusted by the nuts 68. By means of a pin 70 this screw-rod is secured in a slot 72 in an upwardly-extending projection 73 of the plate 5 on the front thereof. Both ends of the screw 69 have flattened portions 74 and 75, the lower portion 74 being located within the slot 72 and the upper portion 75 being located in a vertical narrow slot 76 in the plate 65.

By means of the connections shown the plate 5 may be adjusted up and down with very little lost motion by turning the nuts 68, the pin 70 allowing the necessary pivotal swing and the screw 69 preventing any sidewise motion. Of course when the plate is adjusted upwardly it carries with it all the parts of the button-chuck and allows the presser-bar 14 to be lifted a greater distance under the influence of the spring 20, thus providing for fabrics of different thicknesses, and by means of this adjustment the button may be held a greater or less distance from the fabric, thus varying the length of the thread-neck as desired. The adjustment of the plate 5 also carries with it the winding mechanism as well as the button-chuck, as will be hereinafter described.

By depressing the treadle $n$ the presser-lever 14 is raised and the button-chuck opened. The fabric is then inserted under the presser-lever and a button placed between the three jaws 44, 45, and 46 of the button-chuck. The pedal is then released and the presser-bar falls, confining the goods, and the fourth jaw 35 of the button-chuck swings in and firmly holds the button in its proper position, ready to be sewed on, as shown in Fig. 18. As soon as the pressure on the treadle $n$ is taken off the spring on the bar 1 restores all the related parts, the button-chuck, presser-bar, &c., to their proper positions.

After the fabric and button have been inserted in the machine the sewing operation is next in order. The operator presses down the right-hand treadle 77, to which is pivoted a rod 78. This rod is adjustably connected to a second rod 79 by means of a perforated clamp 80 and the set-screws 81. (See Fig. 1.) The rod 79 is connected near the back of the machine to a lever 22, journaled on a stout pin 83 in perforated ears or projections 84 and 85, extending downwardly from the bed-plate, with which plate they may be made integral or to which they may be attached in any suitable manner. The pivotal portion 86 of this lever is quite long, as shown in Fig. 4. Opposite the part 82 and nearly parallel therewith is the part 87, forming the second arm of the lever. This arm 87 has a pointed projection 88, (see Figs. 2 and 13,) on which are fastened the pins 89 and 90, the use of which will be hereinafter described. The extreme end of the arm 87 is considerably enlarged, as shown at 91, which end part is composed of two parallel portions 93 and 94, united by a flat portion 92, (see Fig. 4,) forming quite a large trough. On one side of one of the parts 91 is a projection 95 (see Figs. 2 and 4) for the purpose of strengthening the same. On the part 94 is a boss 96, (see Fig. 4,) carrying a pin 97. (See Fig. 1.) As the arm 82 is moved downward by the motion of the treadle 77 the arm 87, carrying the extensions 93 and 94, is moved upward until the pawl 98, operated by the spring 99, passes the pin 90 and springs under it, (see Fig. 13,) holding it fast until it is disengaged therefrom. After the treadle 77 has once been moved down, causing the pawl 98 to engage the pin 90, the lever 87 is held in this position until the required number of stitches have been inserted through the holes in the button and the required number of windings put around the neck, when the pawl 98 will be released and then the machine can be operated again.

It should be understood that the operation of the winding mechanism is entirely beyond the control of the operator, and that the extent of its operation is determined by the adjustment of the machine, and that after the treadle 77 has once been moved the machine cannot be accidentally operated in any way until the sewing and winding operations are completed and the pawl 98 disengaged from the pin 90, thus preventing mistakes on the part of the operator. As the arm 87 is thrown upward it causes a partial rotation of the shaft 100 (see Fig. 4) against the tension of the spring 101, which is wound around said shaft, by the following means: Within the trough formed between the parts 93 and 94 is engaged the end of an arm 103, firmly fixed to the shaft 100 by the pin 104 or any other suitable means. The end of the arm 103 is expanded, as shown at 105, to nearly fill the trough between the parts 93 and 94. In this end is journaled on a pin 106 the pawl 107, and the spring 108 normally presses the pawl 107 to the right, as shown on Fig. 4. This pawl 107 has a projection 109, (see Fig. 4,) against which the pin 97 strikes when the treadle 77 is operated. The movement of the pawl 107 causes the movement of the arm 103, and therefore a movement of the shaft 100. The pawl 107 at its rear end is provided with an adjusting-screw 110, (see Figs. 4 and 16,) held in place by a nut 111. This adjustment is for the purpose of stopping the sewing at exactly the desired moment.

The sewing index mechanism, or mechanism for exactly regulating the number of stitches passed through the holes in the button, will next be described. The bed-plate is provided with a slot 112. (See Figs. 16 and 17.) Extending over this slot 112 is a slotted index-plate 113, fastened to the bed-plate by screws 114. (See Fig. 1.) The index-plate is provided with a graduated scale, so that the exact number of stitches can be regulated by sliding the hand-wheel 115, Fig. 1 and 17, back and forth. This hand-wheel is screw-threaded on a vertical stud of the riser 116, which extends downwardly through the slot in the bed-plate and index-pan 120. The riser 116 is a little wider than the slot in the index-plate, and above the slot in the index-plate is a flat plate 117, a little wider than the slot in the index-plate, and two pins 118 (shown in dotted lines in Fig. 16) extend from the plate 117 into the riser 116 to prevent the plate 117 from twisting. The riser 116 extends downwardly through a slot 119 in the index-pan 120, which will be hereinafter described. This riser 116 is formed integral with an arm 121, which arm is loosely mounted on the shaft 100 by means of a long boss 122. (See Fig. 16.) When the hand-wheel is loosened, the arm 121 and its attached parts may be moved back and forth, thus varying the number of stitches, since the number of stitches is determined by the extent of travel of the pin 124, the initial position of which is determined by the position of the arm 121, which carries the steel shoe 121ª, against which the head 143 of the lever 142 bears. The final position of the pin 124 is constant and is that position which is one-half of a revolution of the shaft $e$ later than the position in which the pawl 107 is released from the pin 97. The shaft $e$ carries the spiral index-screw 123. (See Fig. 4.) The tilting index-pan 120 carries a downwardly-projecting pin 124, which when the pedal 77 is pressed down enters and engages with the screw 123, this screw being fixed to the shaft $e$ by the set-screw 125 or by any other suitable means. As the shaft $e$ revolves, as it does intermittingly under the action of the belt $c$ by clutch mechanism that will be hereinafter described, it drives the needle, as heretofore described, and the pin 124 is carried forward until the plate 126, Fig. 16, strikes the screw 110. This causes the pawl 107 to move against the tension of the spring 108, which releases the pawl 107 from the pin 97, and the shaft 100 under the influence of the strong spring 101 brings the position shown in full lines in Fig. 7. The distance which the plate 126 is set from the screw 110 regulates the number of stitches which the sewing mechanism makes.

The means for releasing the pawl 98 from the pin 90 will next be described. The pawl 98 is loosely mounted on a shaft 127, Figs. 4, 13, and 16, and the spring 99, secured to said shaft and said pawl, operates to normally keep said pawl pressed up against the pin 90. An adjustable stop for this pawl is provided, consisting of the screw 128, passing through an extension 129 on the index-pan 120 and provided with a set-nut 130 for holding it in any desired position. In fact, the whole index-pan is mounted upon this shaft 127, which passes through perforations in the edges thereof, as shown in Fig. 16. The movement of the index-pan 120 from the position shown in Fig. 13 back to its original horizontal position causes the screw 128 to strike against the pawl 98, forcing it forward out of contact with the pin 90. The index-pan 120 is provided with a downward extension 131, (see Fig. 13,) and to this extension is pivoted a rod 132, around which is wrapped a spring 133, loose washers 134 being provided against which said spring bears. The rod 132 is screw-threaded at one end and carries the adjusting-nuts 135. The screw-threaded end of the rod 132 passes loosely through a perforation in the arm 136, which is made integral with the boss 137 of the arm 103, which boss is journaled on the shaft 100. (See Fig. 4.) When the treadle 77 is pressed down, drawing with it the lever 82 97 and moving the arm 103 and the shaft 100, the arm 136 is also moved, compressing the spring 133, tilting the pan 120, and bringing the pin 124 into engagement with the screw-thread 123, as already described.

The operation of the tilting index-pan will next be described, reference being had especially to Figs. 4, 13, 16, and 17. This index-pan, as already described, is mounted near one edge thereof on the shaft 127. Opposite this shaft are two right-angled pins 138, fastened to the under side of the bed-plate with their ends projecting under one edge of the index-pan, thus limiting its tilting movement. The index-pan is provided with four slots, the long central slot 119 serving to guide the movement of the pin 124, as will be hereinafter described. In front of this slot is a curved slot 139, the use of which will hereinafter be described when the operation of sewing on a four-hole button is described. The slot 140 provides for the free motion of the pawl 107, so that it will not touch the pan. The slot 141 at the back affords a space for the operation of the means which retracts the index-finger 124.

It will be understood, of course, that before the sewing mechanism can be operated the pan 120 must be tilted into the position shown in Figs. 13 and 17, so that the pin 124 will engage the screw-thread 123. This is accomplished by the movement of the arm 136 and the spring 133. The index-pin 124 is carried at the end of a curved lever 142. (Shown partly in full and partly in dotted lines in Fig. 16.) The upper head of the lever 142 is enlarged, as shown at 143 in Fig. 16, and is a little wider than the slot 119. On the pin 124 are mounted two arms 144 and 145, which are at right angles to each other and which, together with the arm 126, are formed in a single piece, the arm 126 being parallel to but extending in the opposite direction from the arm 145. At the point where the arm 126 joins the arm 144 is a pin 146, riveted therein. This pin has an enlarged head 147, slightly wider than the slot 119 in the index-pan 120. Between the head 147 and the piece formed by the arms 126, 144, and 145 the pin 146 is enlarged to loosely fit the slot 119, and a washer which loosely fits the slot 119 is placed on the pin 124 between the head 143 and the piece just mentioned, which washer and the enlarged portion of the pin 146, working in the slot 119, serve to cause the pin 124 to travel in a straight line, carrying with it the arms 145 and 126. The lever 142 is pivoted on a pin 148, which extends upward from the top of the index-pan 120. This lever has a slot 149 surrounding the pin 148, so that when the pin 124 moves forward in a straight line the lever 142 may yield a little to permit rectilinear motion of the lever 124. The pin 148 has an enlarged head 150 to keep the lever from dropping down over the pin. A spring 151 is attached to the pan and to a link 152, which is attached to the lever 142. This spring serves to draw back the lever 142 and the parts connected thereto as soon as the pin 124 is released from the screw 123 after the sewing operation is completed, bringing the pin 124 and its connected parts back to their original position, ready for the next sewing operation. This retraction, however, cannot take place until the winding mechanism has been operated. The means by which such retraction is prevented will be described in connection with the winding mechanism. The sewing operation stops just before the pin 124 has become disengaged from the left-hand end (looking at Fig. 4) of the screw 123, and the pan 120 is kept tilted down in the position shown in Fig. 13 until after the winding is completed, so that it is impossible to start the sewing mechanism again until after the completion of the winding mechanism.

The means whereby when in sewing on a four-hole button the number of stitches is automatically divided and half of said stitches put into the front pair of holes and the other half of said stitches put in the rear pair of holes will now be described. It should be stated at the outset that in this case the hand-wheel 115 should be set for an even number of stitches. Referring to Fig. 16, the long boss 122 has made integrally therewith a downwardly-projecting pin 153 of considerable length. Mounted on this pin is a sleeve 154, held in place by a pin 155. The sleeve 154 has a connection 156 arranged at right angles to said sleeve, and this part 156 has connected to it at right angles thereto a sleeve 157, through which passes a rod 158. From this rod extends a pin 159, which passes into the slot 139 in the index-pan 120, said pin 159 being bent at right angles, as shown at 160, in order to give it the proper direction. The lower end of the rod 158 is supported in perforated ears 161 and 162, which extend outwardly from a long sleeve 163, pivotally mounted on a pin 164, which projects downwardly from the under side of the bed-plate to which it is secured. This pin 164 passes through still another slot 165 in the index-pan 120. A pin 166 serves to keep the sleeve 163 on the pin 164, and a washer 167 is preferably used between said pin 166 and said sleeve 163. It should be noted that the lower end of the bar 158, as shown in Fig. 16, is practically fixed. It merely has a slight pivotal motion. The upper end of the bar 158 is, however, capable not only of a pivotal motion, but also of a sliding motion whenever the arm 121 is moved on the shaft 100 when the wheel 115 is moved on the index-plate to determine the number of stitches passed through the button. The free end of the projecting pin 159 is practically in a line between the two pins 153 and 164, on which the arm 158 is pivoted. It follows, therefore, according to the principle of similar triangles that a movement of the arm 121 causes a movement of the free end of the pin 159 of exactly half the distance of the movement of the arm 121, considering the movement of the free end of the pin 159 to be in a straight line parallel to the shaft 100. Though the free end of the pin 159 is moved in a circular path, the inaccuracy thereby introduced is practically negligible. Whenever the index-wheel 115 is moved, therefore, the free end of the pin 159 is moved so that its tripping position is just half-way between the center of the pin 124 when said pin is in its initial position and the center of said pin when it is at the left-hand limit of its motion, as shown in Fig. 4. Therefore when the pin 124 is moved during the sewing operation the working face of the arm 145, which is in line with the center of pin 124, will trip the pin 159 at exactly the time when half the number of stitches have been put through the front pair of holes of the button. When the arm 145 strikes the pin 159, it turns said pin to the left, as shown on Figs. 4 and 16, and operates the shifting mechanism by means which will now be described. Between the ears 161 and 162 and on the bar 158 is fastened a vertical bar 168. (See Fig. 17.) A pin 169, which passes through this vertical bar 168 and the bar 158, unites them firmly together, both of them being free to revolve in the ears 161 162 and the sleeve 157. The end of the bar 168 is slightly larger than the perforations in the ears 161 and 162, thereby holding the bar 158 in its proper position. A spring 170 (see Fig. 16) is between the vertical bar 168 and the sleeve 163, tending to throw this bar always to the right-hand end of the machine. The upper part of the bar 168 has a corner or notch 171, which corner the plate 172 is adapted to engage. This plate is rigidly mounted by means of screws or in other desired manner on an extension 173 of the casting 174, which casting 174 is mounted on the shaft 127, as shown in Fig. 17, to which shaft it is attached in any suitable manner. The rear end of the casting 174 has a projection 175, adapted to engage with a projection 176 on a downward projection 177, which is attached to the bed-plate of the machine. A screw 178, provided with a nut 179, passes through the bed-plate of the machine, and in the position shown in Fig. 17, which is for a two-hole button, the parts 175 and 176 being in contact, there is no shifting of the button-carrying chuck. When, however, the screw 178 is unscrewed, so as to leave a space within which the extension 175 may vibrate, then the button-carrying devices will be automatically shifted when the pin 159 is struck by the arm 145 by means which will now be described. It should be noted, however, that when the machine is sewing on a two-hole button the pin 159 is merely brushed aside by the movement of the arm 145 against the tension of the spring 170 and the shifting of the button-carrying mechanism does not take place, because when the extension 175 is brought down to touch the stop 176 the plate 172 cannot engage the corner 171 in the bar 168, as it is above it, and unless this engagement takes place and the screw permits of the proper movement of the projection 175 the button-shifting mechanism cannot operate.

The button-shifting mechanism operates automatically and is set in position to be operated in the following manner: When a four-hole button is to be sewed on, the parts are arranged as in Fig. 12, where the rod $s$ passes loosely through a large aperture 180 in the arm 181. This arm 181 is rigidly attached by means of a set-screw 182 to the shaft 127. This shaft 127 has upon it a strong spring 183, one end of which bears against the bed-plate and the other end of which is carried by a boss 185, fastened to the shaft 127 by a set-screw 186. (See Fig. 4.) The shaft 127 (see Fig. 12) also carries a split nut 188, a set-screw 189 serving to firmly hold the nut 188 in any desired adjusted position upon the shaft 127. On the upper part of the nut 188 is a pin 189, loosely passing between ears 190 191, (see Fig. 12,) which project downward from the plate 9 through a slot in the bed-plate. A movement of the nut 188 to the left, as shown in Fig. 12, will carry with it the entire button-holding chuck and the parts connected therewith, so that a partial rotation of the shaft 127 when the parts are properly adjusted will shift the button-carrying chuck forward, so that the vibrating needle will pass through the rear pair of holes, and this shifting is effected, as said above, at exactly the instant when half the number of stitches have been passed through the holes in the button. Of course in the position shown in Fig. 17 no such shifting can take place, because the casting 174, which is firmly held between the screw 178 and the stop 176, prevents any rotation of the shaft 127. On the other hand, when the screw 178 is turned back a shifting will occur at the proper time. It cannot occur, however, until half the number of stitches have been passed through the rear pair of holes of the button, because up to that moment the plate 172 is engaging the notch 171 in the bar 168, thus preventing the movement of the shaft 127, to which the plate 172 is rigidly attached by means of the extension 173 and casting 174. At the proper moment, however, when the arm 145, which is driven forward by the pin 124 as it engages the moving screw 123, strikes the pin 159 it moves said pin, the bar 158, and the bar 168, which is attached thereto, bringing the corner 171 out of engagement with the plate 172, at which moment the spring 183 imparts a partial rotation to the shaft 127, the amount of rotation given to this shaft being determined, however, by the position of the screw 178. Thus by a simple means of adjustment the machine may be set to sew on a two-hole button or a four-hole button, and in the latter case the shifting from the front pair of holes to the rear pair of holes is automatically done by the machine just at the instant when half the number of stitches have been passed through the button. When two-hole buttons are used, the rod $s$ is slipped out of the aperture 180 in the arm 181 (see Fig. 12) and the screw 178 is adjusted to bring the extension 175 into engagement with the stop 176. (See Fig. 17.) Either or both of these adjustments will render the button-shifting mechanism inoperative. The pulley $d$ runs constantly; but the shaft $e$ only runs intermittently when a projection on the pulley engages a clutch fastened to the shaft. This engagement takes place when the treadle 77 is pressed down and the engagement continues until the requisite number of stitches have been passed through the button, when the clutch is automatically disengaged and the sewing ceases. The mechanism for effecting these results will next be described.

The bed-plate of the machine is longer than the usual bed-plate of a sewing-machine, and the right-hand end, as shown in Fig. 4, is simply an open framework fitted with bosses, which serve as bearings for the shafts $e$ and 100. On the shaft 100 is journaled a long sleeve 192, said sleeve being long enough to just fill in the open space in the framework. This sleeve is attached to the shaft 100 by bolts 193, or it may be fastened thereto in any desired manner. To this sleeve 192 and preferably made integral therewith is a C-lever 194, preferably made with a central rib 195 for strength. This lever is shown in Figs. 1 to 7. This lever is fastened to the shaft 100 and encircles the shaft $e$. Joined to the ends of the lever is the switch-cam 196. (See Figs. 2, 7, 10, and 11.) Attached to the under side of the bed-plate and encircling the shaft $e$, which passes through a perforation therein, is a wide right-angled support 197, (see Figs. 4 and 6,) it being attached to the bed-plate by screws 198. The right-hand end of this support is cut away, leaving two ears 199 and 200, in which is pivoted a long pin 201, on which is mounted a yoke 202 with a bell-crank extension 203, made integrally therewith. This yoke carries pins 204 212, which loosely engage on opposite sides of a groove 205 in a pulley 206, which is connected by a long sleeve 207 with the driving-pulley $d$. It is evident that the shifting of the pulley 206 by the yoke 202 will also shift the pulley $d$. The pulley $d$ carries a projection 208, which is adapted to engage when the pulley is shifted with a sector-shaped clamp 209, which is keyed or otherwise fastened to the shaft $e$. This clamp is beveled off at 210 and provided with a groove 211, (see Fig. 4,) the purpose of which will be hereinafter described. When the treadle 77 is pulled down to cause the pin 124 to engage the screw 123, the same movement causes the partial rotation of the shaft 100, as already described, and this shaft in its motion carries with it the C-lever 194, and by means of the switch-cam 196 shifts the pulleys 206 and $d$, so that the projection 208 on the latter will engage the clamp 209 and cause the shaft $e$ to rotate by the rotation of the pulley $d$. This rotation continues until the required number of stitches have been passed through the button, when it automatically ceases. This shifting of the pulleys 206 and $d$ is caused by the motion of the C-lever through the following instrumentalities. Toward the rear of the machine the yoke 202 carries an elongated pin 212, the inner end of which engages in the groove 205 and the outer end of which engages in a groove in the switch-cam 196. This groove, as shown in Figs. 10 and 11, is composed of a straight part 213 and inclined parts 214 and 337, (see Figs. 10 and 11,) these two grooves being separated by the switch 215, the purpose of which will be hereinafter more fully described.

When the sewing mechanism is out of operation—in other words, when the C-lever is down, as shown in Fig. 3—the pin 212 occupies the dotted position shown at the top of Fig. 11. When the treadle 77 is pushed down, which operation raises the C-lever into the position shown in dotted lines in Fig. 7, this motion lifts the switch-cam 196, and by reason of the inclined slot 214 causes the yoke 202 to be shifted to the right in Fig. 4, bringing the projection 208 on the wheel $d$ in contact with the clamp 209, whereby the rotation of the pulley $d$ causes the rotation of the shaft $e$, which rotation continues until the arm 126 strikes the screw 110, Fig. 16, when, as already described, the pawl 107 is disengaged from the pin 97, the shaft 100 is released, and the spring 101 revolves said shaft and brings the C-lever 194 to the position shown by full lines, Fig. 7, whereby the cam 196 swings the yoke 202 to the left back beyond its original position, disengaging the pulley $d$ from the clamp 209, whereupon the motion of the shaft $e$ stops. Moreover, the shaft $e$ cannot be again started to rotate until the winding mechanism has been operated.

The winding mechanism will next be described, reference being had especially to Figs. 3 to 11 and to Fig. 1. Connected to the right-hand end of the bed-plate, near the rear thereof, is an upright brace or standard 216. A rod 217 is connected at one end to the top of this brace by a screw 218, and at the other end this rod is fastened to the gooseneck 2 in any suitable manner. Journaled in the standard 216 and in a bearing 219 on the rear of the gooseneck is the driving-shaft 220 of the winding mechanism. This shaft 220 has on it a pulley 221, which by means of a cord or belt 222 is connected with a pulley 223, which is loosely mounted on a bearing formed integral with the right-angle piece 197. The hub 224 is interposed between the bearing 219 and the pulley 221 and is formed integral with said pulley. On the shaft 220 is an index-screw 225 for governing the number of turns of the thread that will be twisted around the neck of thread connecting the button and fabric. The shaft 220 is connected with the shaft 268 (see Fig. 1) by a universal joint 226, and a second universal joint 227 connects the shaft 268 with a shaft 228, which carries a gear-wheel 229, which drives the winding mechanism. The shaft 229 is journaled in a long sleeve 230, which is carried by an extension 231, which extension is firmly secured by screws or in any suitable manner to the upper part of the plate 5, which plate also is provided with an extending arm 232, carrying an upward extension 233, which terminates in a hollow sleeve 234, in which is journaled a shaft carrying a gear-wheel 235. On the other end of this shaft is journaled a beveled gear-wheel 236, which engages the annular beveled gear-wheel 62. (See Figs. 1, 2, 18, and 19.) The annular beveled gear-wheel 62 carries two downwardly-projecting extensions 237 and 238, which are arranged opposite to each other to secure a perfect balance. (See Fig. 19.) In the projection 237 is tightly fastened a shaft 239, on which is loosely mounted a thread-spool 240. A spring 241, pressing against this spool and the projection 237, allows said spool to rotate, but keeps it from overrunning. A clip of usual construction prevents said spool from coming off. Securely fastened in the projection 238 is a shaft or pin 242, the outer end of which is screw-threaded and carries an adjusting-nut 243. Loosely mounted on said shaft 242 are two disks 244 and 245, and a spring 246 keeps said disks yieldingly in contact with each other, which disks serve as a thread-guide and also to maintain a certain amount of tension upon the thread. A washer 247 is located between the disk 244 and the extension 238. The gear-wheel 62 also carries two thread-guides 248 and 249. (Shown in Fig. 1.) The extension 238 also carries another thread-guide 250, which extends down below the button-chuck. On the pin 242 between the washer 247 and the disk 244 is mounted a downwardly-extending arm 251. (Shown best in Figs. 2 and 18.) This arm 251 carries two projecting jaws 252 and 253, which jaws are arranged at an angle to each other and have their inner edges sharpened, thus acting as a pair of scissors, although in operation these are simply carried around the button-chuck and are not caused to approach or recede from each other. The jaw 252 is provided with a slot 254, and a set-screw 255 passes through said slot into the supporting-arm 251, so that the upper jaw may be adjusted toward the under one or away from it. The use of these scissors is to cut the upper sewing-thread carried by the needle, extending from the previously-sewed button just before the winding begins, as otherwise the needle-thread would be drawn down over the edge of the button, presenting an unsightly appearance.

Referring now to Figs. 1, 5, and 6, the shaft 220, carrying the winding-index screw-thread 225, has also secured to it at its right-hand end a circular block 256, provided with a cut-away portion 257, which acts as a cam-face. Made integrally with said block is a sector-shaped projection 258, provided with a cam-face 259 and a slot 260. (See Figs. 5 and 6.) The screw-thread 225 begins at just about the point where the cam-face 257 ends. The shaft 220 is, as said already, operated by the rotation of the pulleys 223 and 221; but as the pulley 223 is loosely mounted on a bearing formed on a piece 197 the shaft 220 is not revolved until the projection 261 on the pulley 223 is engaged by the corresponding projection 262 on the pulley 206, as shown in Fig. 6. The pulley 206 therefore has three positions. The first is a neutral position when the projection 208 on the pulley $d$ is not in engagement with the clamp 209 and when the projection 262 is not in connection with the projection 261. This occurs before the machine is started in operation. The second position is that shown in Fig. 5, in which the pulley $d$ has been shifted to the right, engaging the clamp 209, which rotates the shaft $e$ and operates the sewing mechanism. The third position is shown in Fig. 6 with the projections 261 and 262 in contact, which is the position for operating the winding mechanism. Therefore the winding mechanism and the sewing mechanism can never be operated at the same time, and the winding mechanism cannot be set in operation until after the sewing operation is finished, and, as before explained, the sewing mechanism cannot be set in operation until after the operation of the winding mechanism is finished, thus guarding against mistakes on the part of the operator. The arm 203 terminates in two ears 263, between which ears is pivoted the reduced end of a bar 265 by means of a pin 264. (See Fig. 3.) The upper end of the rod or bar 265 passes loosely through a clip 266, secured by screws 267 and 218 to the top of the standard 216, Fig. 3, the latter screw 218 also passing through the flattened end of the bar 217. Near the upper end of the bar 265 is a sleeve 269, which encircles said bar.

This sleeve is provided with a slot 270, in which works a pin 271, which is fastened to the bar or rod 265. The sleeve 269 is the end of a plate 272. This plate is cut away, forming ears 273 and 274, in which is journaled, by means of a pin 275, a plate 277, which extends through a slot 278, which is cut in the upper part of the standard 216. (See Fig. 3.) This plate 277 is adapted to enter the slot 260 in the block 256 on the shaft 220 when the parts are in the proper position, and when it enters said slot, as shown in Fig. 5, the shaft 220 is prevented from rotation and the winding mechanism stopped. Around the bar 265 is a spring 279, the upper end of which is attached to a pin 280 in the plate 272. The action of the spring 279 normally forces the plate 277 inwardly through the slot 278; but when it is struck by the cam-surface 259 of the block 256 it will yield until the slot 260 comes opposite said plate when it will be forced into said slot by said spring 279, thus locking the shaft 220. At the lower end of the rod 265 there is a similar construction. A downward extension 281 from the right-hand end of the bed-plate is provided with a slot 282. The lower end of this slot is closed by a plate 283, secured thereto by screws 284. Within this slot works the plate 285, which is adapted to be engaged by the cam-face 210 of the block 209 and to enter the slot 211, thus locking the shaft e, to which the clamp 209 is fastened, against rotation. (See Fig. 4.) The plate 285 is journaled by means of a pin 286 in ears 287 of a plate 288, which plate terminates in a sleeve 289, surrounding the bar 265. The sleeve 289 has a slot 290, in which works a pin 291, fastened to the rod 265. The lower end of the spring 279 is attached to a pin 292 in the plate 288, normally tending to force the plate 285 inwardly. When the plate 277 engages the slot 260, as shown in Fig. 5, the winding mechanism is locked and the sewing mechanism free to operate. On the other hand, when the plate 285 engages the slot 211, as shown in Fig. 6, the sewing mechanism is locked and the winding mechanism free to operate, while in the neutral or inoperative position, as shown in Fig. 1, both the sewing and winding mechanisms are locked. The rod 265, as already said, is carried on the arm 203, which is an integral part of the yoke 202. It follows that the shifting of the yoke shifts the rod 265, which acts to lock the winding mechanism and unlock the sewing mechanism, or vice versa, under the usual conditions of sewing, when it is desired to wind a thread around the neck of thread which secures the button to the fabric.

The mechanism for determining the number of turns to be given to the winding thread will next be described. 293 represents a pin adapted to engage the screw-index 225 of the winding mechanism. (See Fig. 8.) This pin is secured to the end of an arm 294. This arm has near its center an extension 295, curved on the arc of a circle and provided with adjusting-holes 296. One end of this arm is bent, as at 297, to contact with the head of an adjusting-screw 298, which passes through the standard 216 and is provided with a nut 299. This screw is so adjusted that when the part 297 strikes it the pin 293 will be under the beveled portion 257 of the block 256, as shown in Fig. 5. The lower part of the arm 294 is enlarged and perforated, and through it passes a rod or shaft 300, on the end of which is a clamping-screw 301. Behind the arm 294 is a second shorter arm 305, arranged parallel with it and terminating in an enlarged portion 306, through which the shaft 300 passes. A large washer 307 rests against a shoulder (not shown) on the shaft 300, and the arm 305 and washer 307 are rigidly secured to said shaft, so that by tightening up the screw 301 the arm 294 is firmly clamped to the shaft 300. Below the perforated portion the arm 305 is provided with an extension which terminates in an ear 302, through which passes an adjusting-screw 303, provided with a nut 304. The arm 305 carries a pin 308, (see Fig. 6,) adapted to pass through the holes 296. After loosening the screw 301 the relative position of the arms 294 and 305 may be varied, thus determining the number of turns to be given to the winding thread. The holes 296 are arranged at such a distance apart that each one represents two turns of the winding thread; but of course the number of holes might be doubled, if desired. From the rear edge of the bed-plate two ears 309 and 310 extend upwardly, as shown in Figs. 5 and 6. Secured in these ears by any suitable means is a pin 311. Loosely mounted on this pin is a long sleeve 312, extending practically the whole distance between the ears 309 and 310. Near its center this sleeve is provided with an upward extension 313, which extension terminates in a long sleeve 314, (see Fig. 7,) and in this sleeve the shaft 300 is journaled. A shoulder 315 is secured to the end of the shaft 300 by a pin 316, by means of which end the washer 307 and end play of the shaft 300 is prevented. The shoulder 315 is provided with a rearwardly-extending arm 317, which is provided with a wire 318, arranged at right angles thereto, to which wire is attached a spring 319, the other end of the spring being secured to the wire 320.

The rear end of the bed-plate of the machine is provided with an upwardly-extending inclined plate 321, through a perforation in which passes the pin 322, secured in place by the nut 323. The upper part of this pin is expanded, as shown at 324, and around this expanded portion is wound a spring 325, beneath which is secured a vibratory arm 326. The spring 325 is secured to the wire 320 and to a pin in the arm 326 and tends to move the arm 326 continually toward the switch-cam 196. The sleeve 312 is provided with an arm 327, made integral therewith and extending rearwardly therefrom, which arm is adapted to engage the top of the pin 322, which thereby limits the movement of said sleeve.

While the sewing operation is going on the C-lever 194 is in the position shown in dotted lines in Fig. 7. When the sewing operation is finished, the lever 194 is shifted into the position shown in full lines in Fig. 7, in which position the beveled stop 328, which is secured to the outside of said lever near one end thereof, engages the arm 326. When this happens, the sewing mechanism is locked by the plate 285, as already described, and the winding mechanism is unlocked, the fall of the cam, the shifting of the yoke 202, and the locking of the sewing mechanism by the plate 285 and the unlocking and starting of the winding mechanism occurring practically simultaneously. The winding operation is then begun and continues until the screw 303, which is driven to the right as the pin 293 is driven to the left by the winding index-screw 225, strikes the arm 326 and gradually pushes it against the tension of the spring 325 to the right, finally pushing the arm 326 from underneath the stop 328 and allowing the C-lever 194 to drop still farther under the influence of the spring 101 on the shaft 100. The C-lever drops until it strikes the screw 330, (see Fig. 3,) which screw engages a downward projection 331 from the bed-plate, said screw being provided with a securing-nut 332. In this position the machine is in what might be called a "neutral" position—that is to say, neither adapted for sewing or winding. The C-lever has, therefore, three positions—the first or neutral position, as shown in Fig. 3, in which the driving-pulley $d$ is not connected so as to operate either the winding or sewing mechanism; the second position, (shown in dotted lines in Fig. 7,) adapted for the sewing operation, the pulley $d$ being shifted to the right, as shown in Fig. 5, and thereby operating the shaft $e$, and the third position, (shown in full lines in Fig. 7,) in which the pulley $d$ has been shifted so as to operate the winding mechanism, as shown in Fig. 6.

Projecting forward from the left-hand end of the sleeve 312, as shown in Figs. 5 and 6, and made integrally therewith is an arm 333, which is adapted to contact with a screw 334, provided with a set-nut 335, which screw passes through a perforation in an extension 336 of the C-lever 194. By means of this contact the pin 293 is kept out of contact with the winding index-screw 225 when the C-lever is in its lowest position. When this C-lever 194 is in its lowest position, as shown in Fig. 3, the pin 293 is withdrawn from the screw 225, and then the spring 319 draws the arm 294 into the position shown in Fig. 5. The spring 319, therefore, has a double function—namely, to hold the pin 293 in engagement with the screw 225 until it is forcibly withdrawn from this engagement and then to return the arm 294 to its initial position, as shown in Figs. 1 and 5.

Referring now to Figs. 10 and 11, the action of the switch-cam will be described more in detail. When the C-lever is in its lowest position, as shown in Fig. 3, the pin 212 is at its highest position in the switch-cam 196, as shown in dotted lines at the top of Fig. 10. When the C-lever is in its intermediate position, as shown in full lines, Fig. 7, it will be locked in that position under ordinary conditions—that is to say, under conditions in which the winding mechanism is not made inoperative by the adjustment of the parts—by means of the arm 326 coming underneath the stop 328, as shown in Fig. 7. In the position shown in Fig. 3 neither the sewing nor the winding mechanism is operative, because neither the pulley $d$ nor the pulley 206 is clutched with the driving mechanism of the winding mechanism or with the sewing mechanism, as the parts are in their neutral position.

While the C-lever is being moved from the position shown in Fig. 3 to the position shown in full lines in Fig. 7 the pin 212 passes downward through the slot 213, which is straight, there being, therefore, no shifting action exerted on the pin. When the C-lever is lifted from the position shown in full lines in Fig. 7 to that shown in dotted lines in the same figure, the pin 212 striking the walls of the inclined slot 214 forces the pulley $d$ to the right to the position shown in Fig. 5, thereby throwing the sewing mechanism into operation, the pin 212 at this time being at the bottom of the slot 214. It is to be understood that during this movement of the C-lever the switch 215 relieves in order to allow the pin 212 to pass. After the sewing operation is completed and the C-lever drops from the position shown in dotted lines in Fig. 7 to the position shown in full lines in the same figure the switch-cam 196 moves with the lever, and the inclined face of the slot 214, together with the face of the switch 215, which is held by spring-pressure in the position shown in Fig. 10, causes the pin 212 to be shifted to the left into the position shown in section-lines in Fig. 10, which swings the pulleys 206 and $d$ from the position shown in Fig. 5 to the position shown in Fig. 6, thereby throwing the winding mechanism into operation. When the winding operation has been finished and the arm 326 is moved out of contact with the stop 328, as already described, the C-lever drops to its lowest position, (shown in Fig. 3,) carrying with it the switch-cam 196. As the C-lever and switch-cam 196 drop the inclined slot 337 in the latter forces the pin 212, which in its motion presses aside the switch 215, to the right, unclutching the pulley 206 from the pulley 223 and bringing the driving mechanism into the neutral position.

Referring to Fig. 5, it will be seen that in some positions of the rod 265, owing to the width of the plate 277, the winding mechanism may still be kept locked even if the sewing mechanism is free to operate. This capability is made use of in the manner about to be explained when it is desired to throw the winding mechanism out of operation altogether and use simply the sewing mechanism—as, for instance, in sewing buttons on the end of coat-sleeves, where a neck of thread is not desired. In this case the pin 308 is set into the zero-hole of the curved arm 295, bringing the screw 303 into contact with the arm 326 and moving said arm far enough so that the stop 328 will not strike it as the C-lever falls. It is imperative, however, when the winding mechanism is to be thrown out of operation that the pin 212 be not allowed to travel up to the position shown in section-lines in Fig. 10, as that would release the plate 277 from the slot 260 and throw the driving-pulley of the winding mechanism into engagement with the pulley 206, which would tend to drive winding mechanism. The following means are provided to prevent this releasing of the locking mechanism and shifting of the pulley 206 into engagement with the pulley 223: The arm 326 has attached to it at right angles thereto a pin 338. (See Fig. 9.) This pin has pivoted to it another pin, 339, which is substantially parallel to the arm 326. The other end of the pin 339 passes through a guiding-aperture in the angle-plate 340, attached to the rear edge of the bed-plate and extending forward therefrom. When the pin 308 is set in the zero-hole of the curved arm 295, this pin 339 operates the switch 215 as the switch-cam 196 is moved down, by the following means:

Referring to Fig. 11, 341 represents a triangular plate fastened by screws to the back of the switch-cam 196. Through this triangular plate passes a pin 342, the front part of which is enlarged, which front part carries the angular switch 215, which is firmly fastened thereto. The walls of the slots in the switch-cam 196 limit the motion of this switch in either direction. Behind the plate 341 and rigidly fastened on the pin 342 is a triangular piece 343, and on a pin 344 at one corner of this triangular piece is pivoted a bell-crank lever 345, made of a thin plate of steel and carrying a projecting stop 346. On a pin 347 in the plate 341 is secured one end of a spring 348, which spring is coiled around the pin 342 and kept in place by a pin 349, the other end of the spring bearing against the stop 346. This spring has a double function, therefore. It governs the movement of the angular switch 215 and also the motion of the bell-crank lever 345, which lever is adapted on the movement of the switch-cam 196 to be engaged by the pin 339 when the latter is held forward by the action of the screw 303 on the pin 326 when the pin 308 is placed in the zero-hole of the curved arm 295. As the C-lever falls from the positions shown in dotted lines in Fig. 7 the outer end of the bell-crank lever 345 engages the end of the pin 339 and is forced upward from the position shown in Fig. 11. This throws the switch 215 into the position shown in dotted lines in Fig. 10, whereby the pin 212 is prevented from traveling in its regular path, which would eventuate in the engagement of the pulleys 206 and 223, and said pin is compelled after being shifted enough to bring the driving-pulley $d$ and the pulley 206 into the neutral position to travel in a straight line, which keeps the pulley 206 out of engagement with the pulley 223. As the pin 212 travels up the switch 215 returns to its normal position, as shown in full lines in Fig. 10, the bell-crank lever having meantime slipped off the end of the pin 339. When, however, the C-lever is raised into the position shown in dotted lines in Fig. 7, the end of the lever 345 merely slips over the pin 339, moving around the pivot-pin 344 against the tension of the spring 348. After the pin 339 passes by the end of the bell-crank lever 345 the spring 348 returns said lever to its original position, this return movement being limited by the striking of the other arm of said lever against the pin 342. The spring 348 has therefore the double function of governing the action of the switch-cam 215 and the lever 345.

Referring now to Figs. 1 and 1$^a$, it will be seen that the right-hand or starting pedal 77 has a downward projection 77$^a$, which is connected by a link 77$^b$ to a lever 77$^c$, which is rigidly attached to the shaft 77$^d$. The shaft 77$^d$ is revolubly mounted in bearings 77$^e$ and $n^a$ at either end, which bearings are formed integral with the supports of the corresponding treadles. Near the bearing $n^a$ the lever $n^b$ is rigidly mounted on the shaft 77$^d$. The action of these parts is as follows: Starting from the position of the pedals as shown in Fig. 1 and in Fig. 1$^a$ by the full lines, if the pedal $n$ were depressed (see the dotted posisition of the pedal in Fig. 1$^a$) it would prevent movement of the lever $n^b$, and hence of the pedal 77. Hence the machine cannot be started until the pedal $n$ has been raised. If now the pedal 77 is depressed, it will move the lever $n^b$ into the position shown by dotted lines in Fig. 1$^a$, when it will prevent the movement of the pedal $n$, and since, as before explained, the pedal 77 is locked after the machine is started the pedal $n$ is also locked, and consequently the functions of the machine cannot be interfered with.

The operation of the machine will be evident from the foregoing description; but for the sake of clearness a few general considerations are submitted.

Both the indexes for the sewing mechanism and winding mechanism are set before the machine is started up and remain set until the machine has done the work which it is set to do. The machine may be adjusted to sew on the button and then wind the neck, or it may be adjusted to sew only, the winding being omitted. Any number of stitches may be passed through the button from two to twenty, and any number of turns may be given to the winding-thread from naught to twenty, these numbers being selected for convenience, as of course any size of indexes desired can be used.

The machine is adapted to sew on either two-hole or four-hole buttons, and in the latter case the number of stitches will be automatically and equally divided among the pairs of holes, one-half the whole number of stitches being put in each pair of holes. The chuck can be adapted to receive any size of buttons and can be adjusted with reference to the bed-plate so as to make any length of neck desired within reasonable limits and to accommodate fabric of different thicknesses.

The machine once started cannot be interfered with, but will continue to run until it has performed the work it is set to do. The winding mechanism carries a small pair of scissors designed to cut the carrying-thread of the sewing mechanism in order to get said carrying-thread out of the way of the winding-cotton. The shuttle-thread is not cut at all, but is carried along from one button to the next. This thread may be trimmed off by hand after the buttons have been sewed on.

The revolving winder, which carries the winding-spool and the tension for the thread thereof, is approximately balanced. When the machine is set so as to sew on buttons and omit the winding, the construction is such that the winding mechanism is not operated at all, but is kept continuously locked.

To operate the machine, the pedal at the left-hand end is depressed. This operation raises the presser-bar for the introduction of the fabric, opens the chuck for the introduction of the button, and in case a four-hole button is used sets the chuck with the first pair of holes in proper position under the needle. The left-hand pedal is then released, and the spring on the presser-bar causes the latter to hold the goods and the movable finger to hold the button in the chuck. The right-hand pedal is then depressed, and this puts the driving-pulley in position to operate the main driving-shaft, and thereby operate the sewing mechanism, this main driving-shaft also operating the shuttle by means of the usual gearing. The machine then begins to sew and makes the number of stitches determined upon by the position of the sewing-index. When the main driving-shaft has made a sufficient number of revolutions for the number of stitches for which the machine is set less one-half a stitch, the pawl which secures the sewing mechanism is released. This brings the driving-pulleys out of driving relation with the main driving-shaft and brings the detent for said driving-shaft into position, the inertia of the main shaft then causing it to revolve until it is caught by its detent. The driving-pulley then moves freely for an instant until it is put into operative relation with the pulley which drives the index-shaft of the winding mechanism. After the winding mechanism is started in operation it continues in operation until it has made the number of windings for which it is set less one-half a turn of the winder index-shaft, when the driving-pulley is released from said winder index-shaft and the inertia of the winder index-shaft and connected parts carries said shaft around until it is locked by its detent, when the parts are returned to their original position and the cycle of operations may be repeated.

While I have thus described a machine adapted to carry out my invention, I wish it to be distinctly understood that I do not limit myself to the particular constructions shown and described, as I believe myself to be the first to produce a machine which will sew a button on fabrics in exact imitation of a hand-sewed button—namely, the button being secured to the fabric by a thread neck around which a winding-thread is wrapped—and I desire to claim this invention broadly. Any machine which will effect this result I consider within the scope of my invention.

Having thus described my invention, what I claim as new, and desire to secure by Letters Patent of the United States, is—

1. In a button-sewing machine, the combination of means for holding a fabric and means for holding a button, said button-holding means being spaced both from the fabric and from the fabric-holding means, whereby the button when sewed on is spaced from the fabric by an extended neck of thread, substantially as described.

2. In a button-sewing machine, the combination of means for holding a button at a definite distance from the fabric to which it is to be secured, and means for adjusting said button-holding means to vary said distance, substantially as described.

3. In a button-sewing machine, the combination of means for holding a fabric, and means independent of said fabric-holding means for holding a button, said button-holding means being spaced both from the fabric and the fabric-holding means, whereby the button when sewed on is spaced from the fabric by an extended neck of thread, substantially as described.

4. In a button-sewing machine, the combination of movable means for holding a fabric, means for adjusting the amount of movement of said fabric-holding means, and means independent of said fabric-holding means for holding a button, said button-holding means being spaced both from the fabric and from the fabric-holding means, whereby the button when sewed on is spaced from the fabric by an extended neck of thread, substantially as described.

5. In a button-sewing machine, the combination of movable means for holding a fabric, means for adjusting the amount of movement of said fabric-holding means, means independent of said fabric-holding means for holding a button, said button-holding means being spaced both from the fabric and the fabric-holding means, and means for adjusting said button-holding means, whereby the button when sewed on is spaced from the fabric by an extended neck of thread, substantially as described.

6. In a button-sewing machine, the combination of adjustable means for holding a button at a definite distance from the fabric to which it is to be secured, and means for shifting said button-holding means when a four-hole button is used, substantially as described.

7. In a button-sewing machine, the combination of means for holding a button at a definite distance from the fabric to which it is to be secured, means for adjusting said button-holding means to vary said distance, and means for shifting said button-holding means when a four-hole button is used, substantially as described.

8. In a button-sewing machine, means for holding a button at a definite distance from the fabric to which it is to be secured, said means including one swinging and a plurality of stationary jaws adapted to engage the edges of the button, substantially as described.

9. In a button-sewing machine, means for holding the button at a definite distance from the fabric to which it is to be secured, said means including a plurality of jaws normally stationary but adjustable to receive buttons of different sizes, and a swinging jaw, substantially as described.

10. In a button-sewing machine, the combination of means for holding a button at a definite distance from the fabric to which it is to be secured, said means including a plurality of gripping-jaws, means for positively adjusting some of said jaws to accommodate buttons of different sizes, and means independent of said gripping-jaws for holding the button therein, substantially as described.

11. In a button-sewing machine, means for holding a button at a definite distance from the fabric to which it is to be secured, said means including a plurality of gripping-jaws, and a swinging jaw which may be moved aside to allow the button to be placed in position, in combination with means for adjusting said gripping-jaws, substantially as described.

12. In a button-sewing machine, the combination of means for holding a button at a definite distance from the fabric to which it is to be secured, said means including a swinging jaw and a plurality of gripping-jaws grooved to receive the edge of said button, and means for adjusting said gripping-jaws, the parts being so arranged that said gripping-jaws approach each other or recede from each other at the same rate when the adjusting means is operated, substantially as described.

13. In a button-sewing machine, the combination of a presser-bar for holding a fabric, means for holding a button at a definite distance from said presser-bar, said means including a swinging jaw, and a single spring having the double function of controlling the action of said presser-bar and said swinging jaw, substantially as described.

14. In a button-sewing machine, the combination of means for holding a fabric, means independent of said fabric-holding means for holding a button, said button-holding means being spaced from both the fabric and the fabric-holding means, and means for simultaneously raising said fabric-holding means and opening said button-holding means before the machine is started, whereby the button when sewed on is spaced from the fabric by an extended neck of thread, substantially as described.

15. In a button-sewing machine, the combination of means for holding a fabric, adjustable means for holding a button at a definite distance from said fabric, and adjustable means for simultaneously raising said fabric-holding means and opening said button-holding means to allow a button to be placed in position in the machine, substantially as described.

16. In a button-sewing machine, the combination of a movable presser-bar, adjustable means for holding a button at a definite distance above said presser-bar, said means including a swinging jaw, and means for simultaneously lifting said presser-bar and swinging aside said swinging jaw to open said button-holding means, whereby the fabric and button may be put in position in the machine, substantially as described.

17. In a button-sewing machine, the combination of means for holding a fabric, adjustable means for holding a button at a definite distance from said fabric, means for simultaneously lifting said fabric-holding means and opening said button-holding means, and means for restoring the parts named to their original positions, substantially as described.

18. In a button-sewing machine, the combination of means for holding a fabric, adjustable means for holding a button at a definite distance from said fabric, a treadle adapted to be actuated by the operator, connections between said treadle and said fabric-holding means and said button-holding means, whereby said fabric-holding means may be raised and said button-holding means may be opened, and a spring for returning the parts named to their normal positions when the treadle is released by the operator, substantially as described.

19. In a button-sewing machine, the combination of means for holding a fabric, means for holding a button at a definite distance above said fabric, means for automatically shifting said button-holding means at the proper time when a four-hole button is used, and means adapted to be actuated by the operator for simultaneously lifting said fabric-holding means, opening said button-holding means, and setting said automatic shifting means into position to be operated at the proper time, substantially as described.

20. In a button-sewing machine, the combination of means for holding a fabric, means for holding a button a definite distance above said fabric, means for shifting said button-holding means at the proper time when a four-hole button is to be used, a treadle adapted to be actuated by the operator, and connections whereby the operation of said treadle lifts the fabric-holding means, opens the button-holding means, and places the shifting means in position to be automatically actuated at the proper time, substantially as described.

21. In a button-sewing machine, the combination of means for holding a fabric, means for holding a button a definite distance above said fabric, means for shifting said button-holding means at the proper time when a four-hole button is to be used, a treadle adapted to be actuated by the operator, and adjustable connections whereby the operation of said treadle lifts the fabric-holding means, opens the button-holding means, and places the shifting means in position to be automatically actuated at the proper time, substantially as described.

22. In a button-sewing machine, the combination of a presser-bar, a button-chuck, means for automatically shifting said button-chuck at the proper time when a four-hole button is used, a treadle adapted to be actuated by the operator, and connections whereby said presser-bar is raised, said button-chuck opened, and said shifting mechanism placed in position to be operated at the proper time, substantially as described.

23. In a button-sewing machine, the combination of a presser-bar, a button-chuck, means for automatically shifting said button-chuck at the proper time when a four-hole button is used, a treadle adapted to be actuated by the operator, and adjustable connections whereby said presser-bar is raised, said button-chuck opened, and said shifting mechanism placed in position to be operated at the proper time, substantially as described.

24. In a button-sewing machine, the combination of a movable presser-bar, a button-chuck, including a swinging jaw, means for adjusting the range of movement of said presser-bar, a treadle adapted to be actuated by the operator, and connections between said treadle and said presser-bar and said button-chuck, whereby the movement of the treadle lifts said presser-bar and opens said button-chuck, and a spring for returning the parts to their normal positions, substantially as described.

25. In a button-sewing machine, the combination of a button-chuck, a support therefor, a movable presser-bar, means for adjusting the range of movement of said presser-bar, means for opening said button-chuck and simultaneously lifting said presser-bar, said means including a link and a bar pivoted to said link, said bar serving to limit the upward motion of said presser-bar and acting as a fulcrum for said link, substantially as described.

26. In a button-sewing machine, the combination of a movable presser-bar, a button-chuck, comprising a swinging jaw, means for swinging said jaw and simultaneously lifting said presser-bar, said means including a spring bearing against said presser-bar, a link and a rod pivoted to said link and limiting the upward movement of said presser-bar, substantially as described.

27. In a button-sewing machine, the combination of means for holding a button, a slotted swinging support therefor, and means for adjusting the button-holding means toward and away from the fabric to which said button is to be secured, said means including a screw freely movable in a single plane but prevented from movement in a plane at right angles to said first-named plane, substantially as described.

28. In a button-sewing machine, the combination of a slotted swinging support, jaws pivoted around a slot in said support, said jaws being capable of adjustment toward and away from each other, and means for adjusting said support, consisting of a slotted plate secured to a stationary part of the machine, a screw located in said slot, said screw being also pivoted to said support, and a hand-wheel on said screw, substantially as described.

29. In a button-sewing machine, the combination of a slotted pivoted support, adjustable jaws pivoted to said support, and a swinging jaw, said jaws serving to engage and hold a button in position, means for adjusting said pivoted jaws toward and away from each other at the same rate, and means for adjusting said support toward and away from the fabric to which said button is to be secured, substantially as described.

30. In a button-sewing machine, the combination of a sliding plate, a slotted support pivoted thereto, adjustable jaws pivoted on three sides of a slot in said support, means for adjusting said support toward and away from the fabric to which the button is to be secured, and means for shifting the sliding plate at the proper time when a four-hole button is used, substantially as described.

31. In a button-sewing machine, the combination of a sliding supporting-plate, a slotted support pivoted thereto, adjustable jaws pivoted to said slotted support, and a swinging jaw, said jaws being adapted to engage a button and hold it in position, means for adjusting said slotted support toward and away from the fabric to which the button is to be secured, and means for shifting said sliding plate at the proper time when a four-hole button is used, substantially as described.

32. In a button-sewing machine, the combination of a swinging jaw, adjustable pivoted jaws, said jaws being adapted to hold a button, a slotted pivoted support for said pivoted jaws, means for adjusting said slotted support, means for adjusting said pivoted jaws toward and away from each other, a sliding plate to which said support is pivoted, a presser-bar mounted on the same pivot, and means adapted to be actuated by the operator for moving said swinging jaw and lifting said presser-bar simultaneously, substantially as described.

33. In a button-sewing machine, the combination of a slidable plate, a long pin secured thereto, a slotted support mounted on said long pin, adjustable button-holding jaws carried by said slotted support, a swinging jaw coöperating therewith, means for adjusting said slotted support, a presser-bar also pivoted on said pin, a plate also pivoted on said pin carrying connections adapted to operate said swinging jaw by the movement of said plate, a guard carried by said last-named plate, and means adapted to be actuated by the operator for simultaneously lifting said presser-bar and guard and swinging aside said swinging jaw, substantially as described.

34. In a button-sewing machine, the combination of swinging and stationary jaws for holding the button, a slotted support for said stationary jaws, a presser-bar, a spring resting against the under side of said presser-bar, a rod or bar limiting the upward movement of said presser-bar, a lever to which said rod is pivoted, a link connected to one end of said lever, a pivoted plate connected to the other end of said lever, means carried by said pivoted plate for operating said swinging jaw, a guard, and connections for simultaneously operating said swinging jaw and lifting said guard and presser-bar, substantially as described.

35. In a button-sewing machine, the combination of a treadle, a lever pivoted to a stationary part of the machine, adjustable connections between said lever and said treadle, a sliding bar engaging one end of said lever, a lever pivoted to the other end of said bar, a link pivoted to one end of said last-named lever, a pivoted plate supported by the other end of said link, a bar pivoted to said last-named lever at or near its center, means for limiting the movement of said bar, a presser-bar, means for limiting the range of movement of said presser-bar, a spring bearing against said presser-bar, button-holding jaws, a support therefor, and means for adjusting said support, substantially as described.

36. In a button-sewing machine, the combination of sewing mechanism, a driving-shaft therefor, adjustable means for determining the number of stitches made by said sewing mechanism in sewing on a button, said determining means being composed of two parts normally separated from each other, means for bringing said normally separated parts into operative relation with each other, and means for locking the parts of said determining means in operative relation with each other until the required number of stitches has been made, substantially as described.

37. In a button-sewing machine, the combination of sewing mechanism, adjustable means for determining the number of stitches made by said sewing mechanism in sewing on a button, said means being composed of two parts normally separated from each other, means for bringing said normally separated parts into operative relation with each other, means for locking said two parts in operative relation with each other until the required number of stitches has been made, and a stop mechanism for disconnecting said parts when the required number of stitches has been made, substantially as described.

38. In a button-sewing machine, the combination of sewing mechanism, driving means therefor, means for determining the number of stitches made by said sewing mechanism in sewing on a button, said last-named means being composed of two parts normally separated from each other, means for moving said normally separated parts into operative relation with each other, and means for shifting said driving means into operative connection with said sewing mechanism, said shifting means including a lever provided with a pin, and a pawl engaging said pin, whereby said driving means and said sewing mechanism are locked in operative relation with each other until the required number of stitches has been made, substantially as described.

39. In a button-sewing machine, the combination with sewing mechanism, driving means therefor, provided with an index-screw, a pin adapted to engage said index-screw and means actuated by the operator for moving said pin into connection with said screw, and simultaneously moving said driving means into operative relation with said sewing mechanism, substantially as described.

40. In a sewing-machine, the combination of sewing mechanism, driving means therefor, including an index-screw, a pin normally out of connection with said screw but adapted to be moved into connection therewith, means for shifting said pin to vary the number of stitches made by said sewing mechanism at a single operation, and means actuated by the operator for throwing said pin into connection with said screw and simultaneously moving the driving means into operative relation with said sewing mechanism, substantially as described.

41. In a button-sewing machine, the combination of sewing mechanism, driving means therefor, including an index-screw, a pin adapted to be moved into connection with said index-screw, means actuated by the operator for moving said pin into connection with said screw, and simultaneously moving said driving means into operative relation with said sewing mechanism, and means for holding said pin in contact with said screw for a predetermined period, substantially as described.

42. In a button-sewing machine, the combination of sewing mechanism, driving means therefor, provided with an index-screw, a movable index-pan carrying a pin adapted to be moved into connection with said screw, and means adapted to be actuated by the operator for tilting said pan and thereby bringing said pin in contact with said screw, and for simultaneously moving the driving means into operative relation with said sewing mechanism, substantially as described.

43. In a button-sewing machine, the combination of sewing mechanism, driving means therefor, provided with an index-screw, an index-pan carrying a pin, said pan being adapted to be moved to bring said pin into contact with said screw, and means for shifting the position of said pin before it is brought into contact with said screw in order to vary the number of stitches made by said sewing mechanism in one operation, substantially as described.

44. In a button-sewing machine, the combination of sewing mechanism and means for varying the number of stitches made by said sewing mechanism in a single operation, said means including an index-screw, a pin adapted to be brought in contact with said screw, and movable supports for said pin, whereby the position of said pin may be varied before it is brought in contact with said screw, thus varying the number of stitches made by said sewing mechanism, substantially as described.

45. In a button-sewing machine, the combination of sewing mechanism, driving means therefor, provided with an index-screw, a tilting index-pan, a pin supported in a slot in said pan and adapted when said pan is tilted to be brought in contact with said screw, and means actuated by the operator for tilting said pan, substantially as described.

46. In a button-sewing machine, the combination of sewing mechanism, a driving-shaft therefor provided with an index-screw, a pin adapted to be brought by the operator into contact with said index-screw, driving means for said shaft, means for automatically clutching said driving means with said shaft, and means for automatically unclutching said driving means from said shaft just before the operation of the sewing mechanism is completed, substantially as described.

47. In a button-sewing machine, the combination of sewing mechanism, a driving-shaft therefor, provided with an index-screw, a tilting pan adapted to be operated by the operator to bring said pin in contact with said screw, means for tilting said driving-shaft, and means for returning said pan and pin to their original positions when a complete cycle of operations has been made or when the button has been completely sewed on, substantially as described.

48. In the sewing mechanism of a button-sewing machine, the combination of a driving-shaft provided with an index-screw, a tilting pan provided with a slot, a pin supported by said pan and movable in said slot, and adapted to engage said screw, means actuated by the operator for tilting said pan and bringing said pin into contact with said screw, and means for returning the parts to their original position at the proper time, substantially as described.

49. In a button-sewing machine, the combination of sewing mechanism, means actuated by the operator for starting said mechanism, a pin carried by said means, a spring-actuated pawl adapted to engage said means when operated, thereby locking said means in position, means for determining the number of stitches made by said sewing mechanism, said last-named means being composed of two parts normally separated from each other, and means for moving said normally separated parts into operative relation with each other, substantially as described.

50. In a button-sewing machine, the combination of sewing mechanism, a driving-shaft therefor provided with an index-screw, a tilting index-pan provided with a pin adapted to engage said screw to determine the number of stitches made by the sewing mechanism, means actuated by the operator for starting said sewing mechanism, means for holding said starting mechanism locked until the required number of stitches has been made, and means carried by said tilting pan for releasing said locking mechanism when the required number of stitches has been made, substantially as described.

51. In a button-sewing machine, the combination of sewing mechanism, a driving-shaft provided with an index-screw, a tilting pan provided with a pin adapted to be brought in contact with said index-screw, starting means actuated by the operator to tilt said pan and thereby bring said pin in contact with said screw, a shaft on which said tilting pan is mounted, a spring-actuated pawl on said shaft, said pawl being adapted to lock said starting means in position for a predetermined time, and means for automatically restoring said pin to its normal position when said starting means is released, substantially as described.

52. In a button-sewing machine, the combination of sewing mechanism, a driving-shaft therefor provided with an index-screw, a tilting pan carrying a pin adapted to engage said screw, a scale for determining the number of stitches, and means for adjusting said pin in accordance with the divisions on said scale, thereby varying the number of stitches made by the sewing mechanism in one operation, substantially as described.

53. In a button-sewing machine, the combination of sewing mechanism, a driving-shaft therefor provided with an index-screw, a tilting pan provided with a pin adapted to engage said screw, a hand-wheel and rod for adjusting said pin, and a scale underneath said hand-wheel, substantially as described.

54. In a button-sewing machine, the combination of sewing mechanism, a driving-shaft provided with an index-screw, a tilting pan provided with a pin adapted to engage said screw, a rod and hand-wheel for adjusting said pin, a scale in connection therewith, and means actuated by the operator for tilting said pan and bringing said pin in contact with said screw, substantially as described.

55. In a button-sewing machine, the combination of sewing mechanism, a driving-shaft provided with an index-screw, a tilting pan provided with a pin adapted to engage said screw, a rod, hand-wheel, and scale for use in the adjustment of said pin, means actuated by the operator to tilt said pan and bring said pin in contact with said screw, and means for locking said pin in contact with said screw for a predetermined period, substantially as described.

56. In a button-sewing machine, the combination of sewing mechanism, a driving-shaft provided with an index-screw, a tilting pan provided with a straight slot, a pin movable in said slot and adapted to engage said index-screw, means for adjusting said pin for varying the number of stitches made by said sewing mechanism in one operation thereof, adjustable means actuated by the operator for tilting said pan and thereby throwing said pin into contact with said screw, said means carrying a pin, a spring-actuated pawl adapted to engage said pin when said pan has been tilted by the operator, and means carried by said pan for disengaging said pawl from said pin after a predetermined period, substantially as described.

57. In a button-sewing machine, the combination of sewing mechanism, a driving-shaft provided with an index-screw, a slotted tilting pan, a pin adapted to travel in said slot and to engage said index-screw when the pan is tilted, a lever in one end of which said pin is mounted, and a spring attached to said lever and adapted to restore said pin to its original position after a button has been completely sewed on, substantially as described.

58. In a button-sewing machine, the combination of sewing mechanism, a tilting pan provided with a straight slot, a driving-shaft provided with an index-screw, a pin adapted to travel in a straight line in said slot, said pin being brought into contact with said screw when said pan is tilted, a lever in one end of which said pin is mounted, a spring for returning said lever and pin to their original positions after a button has been completely sewed on, said lever being provided with a slot permitting it to yield, and thereby allowing the pin to travel in a straight line, substantially as described.

59. In a button-sewing machine, the combination of sewing mechanism, a driving-shaft therefor provided with an index-screw, a tilting pan provided with a long straight slot, a pin carried by said pan and movable in said slot and adapted to engage said screw when said pan is tilted, a rod, hand-wheel, and scale for adjusting said pin to vary the number of stitches, means actuated by the operator for starting said sewing mechanism, including connections, and a lever provided with a pin, a spring-actuated pawl adapted to engage said pin on said lever thereby locking said index-pin in contact with said index-screw until the required number of stitches has been made, and adjustable means carried by said tilting pan and adapted to engage said pawl and move it out of contact with the pin on said lever when the required number of stitches has been made, substantially as described.

60. In a button-sewing machine, means for winding a thread around the neck of thread securing a button to a fabric, substantially as described.

61. In a button-sewing machine, the combination of mechanism for winding the thread around the neck of thread securing a button to a fabric, and means for varying the number of turns given to the winding thread, substantially as described.

62. In a button-sewing machine, the combination of winding mechanism, and automatic means for locking the same against operation as soon as the desired number of turns has been given to the winding thread, substantially as described.

63. In a button-sewing machine, the combination of winding mechanism, provided with an index-screw and a movable finger adapted to be brought in contact with said screw, and means for moving said finger out of contact with said screw when the desired number of turns has been given to the winding thread, substantially as described.

64. In a button-sewing machine, the combination of mechanism for winding a thread around the neck of thread securing a button to a fabric, with means for throwing said winding mechanism out of operation when desired, substantially as described.

65. In a button-sewing machine, the combination of winding mechanism, a shaft for the same provided with an index-screw, an arm carrying a pin adapted to engage with said screw, a second arm and means for adjusting said arm relatively to each other to determine the number of turns to be given to the winding thread, or to throw the winding mechanism entirely out of operation, substantially as described.

66. In a button-sewing machine, the combination of winding mechanism, a shaft for the same provided with an index-screw, an arm carrying a pin adapted to engage said screw, means for driving said shaft intermittently, and means for locking said shaft when the desired number of turns has been given to the winding thread, substantially as described.

67. In a button-sewing machine, the combination of winding mechanism, a shaft for the same carrying an index-screw, an arm carrying a pin adapted to engage with said screw, said arm being provided with a number of perforations, and a second arm, provided with a pin adapted to engage said perforations, whereby by adjusting said arms with relation to each other, the number of turns given to the winding thread can be varied, substantially as described.

68. In a button-sewing machine, the combination of winding mechanism, a shaft for the same provided with an index-screw, an arm carrying a pin adapted to engage with said screw, means for moving said pin out of engagement with said screw when the desired number of turns has been made, and means for restoring said pin to its initial position, substantially as described.

69. In a button-sewing machine, the combination of winding mechanism, a shaft for the same provided with an index-screw, an arm provided with a pin adapted to engage said screw, means for moving said pin out of contact with said screw when the desired number of turns of the winding thread has been made, and a spring for returning said arm and pin to the initial position, said spring also serving to keep said pin in contact with said screw until it is forcibly withdrawn therefrom, substantially as described.

70. In a button-sewing machine, the combination of winding mechanism, a shaft for the same provided with an index-screw, an arm provided with a pin adapted to engage with said screw, a second arm adjustably connected to said first-named arm, whereby the number of turns of the winding thread may be varied, a support for said arm, means for moving said support and thereby moving said pin out of contact with said screw when the desired number of turns has been made, and a spring connected to said support to bring said arms back to their initial positions, substantially as described.

71. In a button-sewing machine, the combination of sewing mechanism, means for adjusting said sewing mechanism to vary the number of stitches, said means including an index-screw, a pin adapted to engage said index-screw, a rod, hand-wheel and scale for adjusting said pin, and means carried by said adjusting means whereby when a four-hole button is used, said button is automatically shifted after half the number of stitches has been made by said sewing mechanism, substantially as described.

72. In a button-sewing machine, the combination of sewing mechanism, a driving-shaft therefor provided with an index-screw, a slotted tilting pan, an index-pin traveling in a slot in said pan and adapted to engage said screw when said pan is tilted, means for adjusting said pin before the sewing mechanism is started to vary the number of stitches made by said sewing mechanism in sewing on a button, a curved slotted lever carrying said index-pin, and a spring to bring said lever back to its original position after a button is completely sewed on, substantially as described.

73. In a button-sewing machine, the combination of sewing mechanism, a driving-shaft therefor provided with an index-screw, a tilting pan, an index-pin carried by said pan, means for adjusting said pin to vary the number of stitches made by said sewing mechanism in sewing on a button, means actuated by the operator for tilting said pan and bringing said index-pin into engagement with said screw, means for locking said pan in its tilted position until after the required number of stitches has been made by said sewing mechanism, and a spring for returning said tilting pan to its original position when said locking means is disengaged, substantially as described.

74. In a button-sewing machine, the combination of sewing mechanism, an intermittingly-running driving-shaft provided with an index-screw, a tilting pan provided with an index-pin, a constantly-running pulley on said driving-shaft, means for causing said pulley to drive said driving-shaft, said means being adapted to be actuated by the operator and said means also operating to tilt said pan and bring said index-pin into engagement with said index-screw, means for locking the parts in this position until the required number of stitches has been made by the sewing mechanism, and means for releasing said parts and restoring them to their original positions after a button has been completely sewed on, substantially as described.

75. In a button-sewing machine, the combination of a sewing mechanism, an intermittingly-running driving-shaft therefor provided with an index-screw, a tilting pan provided with an index-pin adapted to engage said screw, a clutch on said driving-shaft, a constantly-running pulley thereon, means for shifting said pulley into engagement with said clutch and simultaneously bringing said index-pin into contact with said screw, said means including a pivoted arm, a second arm fastened thereto, a bar pivoted to said pan and passing through said second arm, a spring surrounding said bar, substantially as described.

76. In a button-sewing machine, the combination of sewing mechanism, an intermittingly-running driving-shaft therefor provided with an index-screw, a tilting pan provided with an index-pin adapted to engage said screw, means adapted to be actuated by the operator for tilting said pan and thereby bringing said pin into engagement with said screw, said means being provided with a projecting pin, a spring-actuated pawl adapted to engage said last-named pin and hold the parts in the position named until the sewing mechanism has completed its work of sewing on a button, and adjustable means carried by said tilting pan for disengaging said pawl from said pin when the sewing operation is completed, substantially as described.

77. In a button-sewing machine, the combination of a driving-shaft provided with an index-screw, a pin adapted to engage said index-screw, a movable arm adapted to engage said pin and move it against the tension of a spring to vary the number of stitches made by said sewing mechanism, a pivot-plate carried by said movable arm, a bar mounted in said pivot-plate, a pivotal support for the other end of said bar, and a bent pin located at the center of said bar, the parts being so arranged that said bent pin is moved aside when the index-pin has traveled one-half of the space through which it is carried by said index-screw, substantially as described.

78. In a button-sewing machine, the combination of an intermittingly-running driving-shaft provided with an index-screw, an index-pin adapted to be brought in engagement with said screw, angle-bars carried by said pin, means for adjusting said index-pin before it is brought into engagement with said index-screw, said means including a sliding arm, a bar, one end of which is secured in a pivoted bearing on said sliding arm, said bar being free to revolve against the tension of a spring, a pivoted bearing for the other end of said bar and a bent pin carried by said bar at its center, said bent pin being adapted to be moved aside by one of said angle-bars at the exact instant when the index-pin has traveled one-half of the distance through which it is carried by the index-screw, substantially as described.

79. In a button-sewing machine, the combination of sewing mechanism, an intermittingly-running driving-shaft therefor provided with an index-screw, an index-pin adapted to be brought into engagement with said screw, which engagement determines the number of stitches made by said sewing mechanism, means adapted to be actuated by the operator for operating said driving-shaft, means for locking the parts named in position until the sewing mechanism has finished its allotted work in sewing on a button, an angle-bar carried by said pin, and means operated by said angle-bar at about the end of said sewing mechanism to release said parts, thereby stopping the sewing operation, substantially as described.

80. In a button-sewing machine, the combination of sewing mechanism, an intermittingly-running driving-shaft therefor, means actuated by the operator for starting said shaft in motion, a spring for returning said means to their normal positions, means for determining the number of stitches made by said sewing mechanism in sewing on a button, said means being composed of two parts normally separated from each other, and brought into operative relation with each other by the means actuated by the operator, means for locking said normally separated parts in operative relation with each other until the required number of stitches has been made, and an automatic stop mechanism for stopping the sewing operation when the required number of stitches has been made, substantially as described.

81. In a button-sewing machine, the combination of sewing mechanism, an intermittingly-running driving-shaft provided with an index-screw, a slotted tilting pan, an index-pin carried by said pan and adapted to be brought into engagement with said screw, said pin being caused to travel in a straight line by a slot in said pan, means for adjusting said pin to vary the number of stitches, said means consisting of a scale, a hand-wheel and rod carried thereby, and a movable arm adapted to engage said pin, an angle-bar carried by said pin, means carried by said movable arm which is struck by said angle-bar when said pin is moved half the distance it travels in sewing on a button, a slotted lever in one end of which said pin is mounted, a spring normally tending to bring said pin into contact with said movable arm, means adapted to be actuated by the operator for tilting said pan and thereby bringing said index-pin into engagement with said screw, a spring for returning said pan to its normal position, means for locking said pan in its tilted position until the required number of stitches has been made by the sewing mechanism, and adjustable means carried by said tilting pan for disengaging said locking means at the proper time, substantially as described.

82. In a button-sewing machine, the combination of sewing mechanism and independently-operated winding mechanism, said sewing mechanism being idle when the winding mechanism is in operation, said winding mechanism including a revolving gear-wheel, and a thread-spool and tension device carried by said gear-wheel on opposite sides of the same, whereby a perfect balance is obtained, substantially as described.

83. In a button-sewing machine, the combination of mechanism for winding a thread around the neck of thread securing a button to a fabric, severing means carried by said winding mechanism, and a guard surrounding said mechanisms, substantially as described.

84. In a button-sewing machine, the combination of winding mechanism and means operated thereby for severing the sewing-thread, substantially as described.

85. In a winding mechanism of a button-sewing machine, the combination of a revolving gear-wheel, and means carried by said gear-wheel, for severing the sewing-thread, substantially as described.

86. In a winding mechanism for button-sewing machines, the combination of a revolving gear-wheel, a thread-spool carried by said gear-wheel, and a tension device and scissors carried by said gear-wheel diametrically opposite to said thread-spool, substantially as described.

87. In a winding mechanism for a button-sewing machine, the combination of a revolving gear-wheel, and a thread-spool, tension device, severing device and thread-guides carried thereby, substantially as described.

88. In a button-sewing machine, the combination of a revolving wheel, thread-guides and a tension device carried thereby, and means for operating said wheel, said means including a shaft provided with an index-screw adapted to terminate the operation of said wheel, substantially as described.

89. In a button-sewing machine, the combination of an annular gear-wheel for driving the winding mechanism, a support therefor, gearing carried by said support, and a tension device, a severing device, thread-spool and thread-guides carried by said annular gear-wheel, substantially as described.

90. In a button-sewing machine, the combination of a horizontal gear-wheel, a support therefor, gearing carried by said support, and a tension device, thread-spool, thread-guides, and scissors carried by said wheel, substantially as described.

91. In a button-sewing machine, the combination of a horizontal gear-wheel, a thread-spool carried thereby, an intermittingly-revolving shaft, connections between said wheel and said shaft, means for automatically starting said driving-shaft at the proper time, and means for automatically stopping said driving-shaft at the proper time, said means including an index-screw for determining the number of turns made by said gear-wheel, substantially as described.

92. In a button-sewing machine, the combination of a horizontal gear-wheel, a thread-spool carried thereby, an intermittingly-running driving-shaft provided with an index-screw, connections between said gear-wheel and said shaft, an arm provided with an index-pin engaging said screw, means for automatically starting the revolution of said shaft at the proper time, and means for simultaneously bringing said index-pin into engagement with said index-screw, substantially as described.

93. In a button-sewing machine, the combination of a horizontal gear-wheel, a thread-spool and thread-guides carried thereby, an intermittingly-running driving-shaft, connections between said shaft and said gear-wheel, and means for automatically starting said driving-shaft and for stopping the same when the required number of revolutions have been given to said gear-wheel, substantially as described.

94. In a button-sewing machine, the combination of winding mechanism, including a horizontal gear-wheel, a thread-spool, tension device, thread-guides and scissors carried by said gear-wheel, an intermittingly-running driving-shaft for said winding mechanism, and means for locking said winding mechanism against operation when the required number of turns has been given to said gear-wheel, substantially as described.

95. In a button-sewing machine, the combination of winding mechanism including a horizontal gear-wheel, a tension device and thread-spool carried thereby, an intermittingly-running driving-shaft, and automatic means for varying the starting and stopping of said driving-shaft and thereby the number of turns given to said winding mechanism, substantially as described.

96. In a button-sewing machine, the combination of winding mechanism including a horizontal gear-wheel, a thread-spool and tension device carried thereby, an intermittingly-running driving-shaft for said winding mechanism, means for locking said shaft after the required number of revolutions thereof has been made, and means for varying the number of revolutions made by said shaft in applying the winding thread to a button, substantially as described.

97. In a button-sewing machine, the combination of winding mechanism including a horizontal gear-wheel, a thread-spool, tension device, thread-guides, and scissors carried by said gear-wheel, an intermittingly-running driving-shaft therefor provided with an index-screw, connections between said shaft and said gear-wheel, an arm provided with an index-pin adapted to be brought into engagement with said screw, means for disengaging said index-pin from said index-screw at the proper time, a spring for returning said arm and index-pin to their original positions, and an adjustable stop for limiting the return movement thereof, substantially as described.

98. In a button-sewing machine, the combination of winding mechanism, an intermittingly-running driving-shaft therefor provided with an index-screw, a pivoted arm provided with an index-pin adapted to engage said screw, a support for said pivoted arm, a spring adapted to bring said pivoted arm back to its original position at the proper time, an extension on said support, and means whereby in the operation of the machine said extension is struck by a moving part and said index-pin thereby moved out of engagement with said index-screw, substantially as described.

99. In a button-sewing machine, the combination of winding mechanism, an intermittingly-running driving-shaft therefor provided with an index-screw, a lock for said driving-shaft, constantly-running driving means therefor, and means for simultaneously shifting said driving means into engagement with said driving-shaft and releasing said lock, substantially as described.

100. In a button-sewing machine, the combination of winding mechanism including a horizontal annular gear-wheel, a tension device, thread-spool, thread-guides, and scissors carried by said gear-wheel, a support for said gear-wheel, gearing mounted on said support, an intermittingly-running driving-shaft provided with an index-screw, connections between said shaft and said gearing, a clutch on said shaft provided with a depression, a locking-plate adapted to engage said depression at the proper time, an arm provided with an index-pin adapted to engage said index-screw, said arm being provided with a number of apertures, a second arm carrying a pin adapted to engage in any one of said apertures thereby varying the number of turns given to said winding mechanism, means for securing said arms together, a pin on which said arms are mounted, a spring connected with said last-named pin, said spring having the double function of returning the index-pin to its original position when it is forcibly disengaged from said screw and to keep said pin in engagement with said screw at other times, a pivoted support for said arms, and means operated by the operation of the machine to move said support at the proper time and thereby move said index-pin out of engagement with said index-screw, substantially as described.

101. In a button-sewing machine, the combination of sewing and winding mechanisms, with means for driving said mechanisms, said means being adapted to be shifted into three positions, the first a neutral position, the second a position for driving the sewing mechanism, and third a position for driving the winding mechanism, substantially as described.

102. In a button-sewing machine, the combination of sewing and winding mechanisms with driving means therefor, consisting of an intermittently-running driving-shaft, a shiftable pulley on said shaft, and means for shifting said pulley into any one of said three positions, namely, a neutral position, a position for driving the sewing mechanism and a position for driving the winding mechanism, substantially as described.

103. In a button-sewing machine, the combination of sewing and winding mechanisms, an intermittently-running driving-shaft, a driving-pulley loosely mounted on said shaft, a clutch on said shaft, and a second pulley loosely mounted on said shaft, said driving-pulley being adapted to either run loose on said shaft, or to be shifted into engagement with the clutch on said shaft, thereby driving the sewing mechanism, or to be shifted into engagement with the second loose pulley on said shaft, thereby driving the winding mechanism, substantially as described.

104. In a button-sewing machine, the combination of sewing and winding mechanism with driving mechanism therefor, consisting of a driving-shaft, a constantly-running driving-pulley loosely mounted on said shaft, a second pulley loosely mounted on said shaft, a clutch carried by said shaft, and a lever provided with a switch-cam for shifting said driving-pulley into any one of three positions, a neutral position, a position for driving the sewing mechanism, and a position for driving the winding mechanism, substantially as described.

105. In a button-sewing machine, the combination of sewing mechanism, a driving-pulley and means for shifting said pulley, said means consisting of a movable lever, a switch-cam carried thereby, and a yoke engaging said switch-cam and said pulley, substantially as described.

106. In a button-sewing machine, the combination of sewing mechanism, winding mechanism, a driving-pulley and a switch-cam for shifting the driving-pulley, said switch-cam being provided with a straight slot, two inclined slots, and a movable switch separating the straight slot from the inclined slots, substantially as described.

107. In a button-sewing machine, the combination of sewing mechanism, winding mechanism, a driving-pulley and a switch-cam provided with a straight slot, inclined slots, a switch separating said straight slot from said inclined slots, and a spring controlling the action of said switch until it is forcibly pushed aside, substantially as described.

108. In a button-sewing machine, the combination of sewing mechanism, an intermittently-running main shaft, a clutch on said shaft, a constantly-running movable driving-pulley on said shaft, a lever, a switch-cam carried by said lever, said lever and cam encircling said shaft, a swinging yoke provided with pins engaging said cam and said driving-pulley and starting mechanism actuated by the operator for shifting said pulley into engagement with said clutch, substantially as described.

109. In a button-sewing machine, the combination of winding mechanism, an intermittently-running main shaft, a movable driving-pulley thereon, a loose pulley thereon for driving the winding mechanism, a lever, a switch-cam carried thereby, said lever and cam encircling said shaft, a yoke provided with pins engaging said pulley and said cam, and a spring for shifting said lever, and thereby moving said driving-pulley into engagement with said loose pulley, substantially as described.

110. In a button-sewing machine, the combination of sewing mechanism, an intermittently-running main shaft, a clutch thereon provided with a depression, a movable constantly-running driving-pulley on said shaft, a lever, switch-cam carried by said lever, said lever and cam encircling said shaft, a yoke provided with pins engaging said cam and said pulley, a spring-pressed plate adapted to engage the depression in said clutch, and means for operating said lever and said cam to shift said driving-pulley into engagement with said clutch, and to simultaneously withdraw said spring-pressed plate from engagement with said clutch, substantially as described.

111. In a button-sewing machine, the combination of sewing mechanism, an intermittently-running main shaft, a clutch thereon provided with a depression, a movable constantly-running driving-pulley on said shaft, a lever, a switch-cam carried by said lever, said lever and cam encircling said shaft, a yoke provided with pins engaging said pulley and said cam, and provided with a projecting arm, a spring-pressed plate adapted to engage the depression in said clutch, and means for operating said lever and said cam, thereby shifting said driving-pulley into engagement with said clutch, and moving said plate out of engagement with said clutch, substantially as described.

112. In a button-sewing machine, the combination of sewing mechanism, an intermittently-running shaft, a constantly-running movable driving-pulley thereon, a loose pulley on said shaft, a clutch on said shaft, a lever, a switch-cam carried by said lever, said cam being provided with straight and inclined slots, and a switch therein, means actuated by the operator for moving said driving-pulley into engagement with said clutch, and a spring for operating said lever, whereby the driving-pulley is first moved into engagement with said clutch, then into engagement with said loose pulley, and then into a neutral position, substantially as described.

113. In a button-sewing machine, the combination of sewing mechanism, an intermittently-running main shaft, a clutch thereon, a constantly-running movable driving-pulley thereon, a loose pulley thereon, a second shaft parallel to said first-named shaft and adapted to drive the winding mechanism, a clutch provided with a depression, on said second shaft a lever, a switch-cam carried by said lever, said lever and cam encircling said main shaft, a yoke provided with pins engaging said driving-pulley and said switch-cam, said yoke being also provided with an extending arm, a bar pivoted thereon, spring-pressed plates carried by said bar and adapted to engage the depressions in said clutches respectively, and means for shifting said lever, the parts being so arranged that under ordinary circumstances one of said clutches is unlocked while the other is locked, substantially as described.

114. In a button-sewing machine, the combination of sewing and winding mechanism, a main shaft, a movable driving-pulley thereon, means for shifting said pulley, consisting of a lever, a switch-cam carried thereby, said cam being provided with a spring-operated switch, and a yoke provided with pins engaging said cam and said pulley, said pulley being shiftable into three positions, one for driving the sewing mechanism, one for driving the winding mechanism, and one a neutral position, and means for automatically operating the switch in said cam so that the pulley can only be shifted into two of said positions, thus rendering the winding mechanism inoperative, substantially as described.

115. In a button-sewing machine, the combination of sewing and winding mechanisms, means for supporting a button at a definite distance above the fabric to which it is to be secured, and means for automatically shifting said button-chuck, if a four-hole button is used, when half the required number of stitches has been passed through the button, substantially as described.

116. In a button-sewing machine, the combination of sewing and winding mechanisms, means for supporting a button at a definite distance above the fabric to which it is to be secured, a support for said button-holding means, provided with downwardly-projecting ears, a pin supported on a shaft and engaging with said ears, and means adapted to be actuated by the operator before starting the operation of sewing on the button to shift said button-holding means backward, so that the needle will pass through the front pair of holes in the button, if a four-hole button is to be used, substantially as described.

117. In a button-sewing machine, the combination of sewing mechanism, winding mechanism, a button-chuck for holding a button at a definite distance above the fabric to which it is to be secured, means for shifting said button-chuck rearwardly before the sewing operation is begun, and means for locking said shifting means in an inoperative position when a two-hole button is to be used, substantially as described.

118. In a button-sewing machine, the combination of sewing mechanism, a button-chuck, a support therefor, provided with downwardly-projecting ears, an operating-shaft for shifting the button, a spring on said shaft, a pin carried by said shaft and engaging said ears, and means for locking said chuck in its rearward position until half the required number of stitches has been made; said means including a rigid plate carried by said shaft, an angle-bar adapted to engage said rigid plate, a spring tending to press said angle-bar into engagement with said plate, and mechanism operated by the action of the machine for withdrawing said angle-bar out of engagement with said plate when half the required number of stitches has been made, substantially as described.

119. In a button-sewing machine, the combination of sewing mechanism, an adjustable index mechanism therefor for determining the number of stitches made thereby, a button-chuck, means actuated by the operator for shifting said button-chuck rearwardly before the sewing operation is begun, means for locking said button-chuck in its rearward position, including a spring-pressed angle-bar, and a plate engaging therewith, and means for moving said bar out of engagement with said plate when half the required number of stitches has been made, said means including a movable pivoted bar fastened to said angle-bar and a bent pin carried by said bar, said pin being struck by the index mechanism of the sewing mechanism, and moved aside, thereby moving said angle-bar against the tension of said spring out of engagement with said plate, said pivoted bar being moved by the movement of said index mechanism, the parts being so arranged that the bent pin moves exactly one-half the distance of said index mechanism when the latter is adjusted, substantially as described.

120. In a button-sewing machine, the combination of sewing mechanism, a button-chuck, a movable support therefor, means for moving said button-chuck rearwardly, and means for locking said button-chuck in its rearward position consisting of a spring-pressed angle-bar and a plate engaging therewith, and means for locking said plate permanently out of engagement with said angle-bar, thereby preventing the rearward movement of the button-chuck when a two-hole button is used, substantially as described.

121. In a button-sewing machine, the combination of means for holding the button at a definite distance from the fabric to which it is to be secured, and means for winding a thread around the neck of thread securing the button to the fabric, substantially as described.

122. In a button-sewing machine, the combination of means for holding the button at a definite distance from the fabric to which it is to be secured, means for winding a thread around the neck of thread securing the button to the fabric, and severing means carried by said winding means, substantially as described.

123. In a button-sewing machine, the combination of means for holding the button at a definite distance from the fabric to which it is to be secured, and means for sewing said button onto said fabric, substantially as described.

124. In a button-sewing machine, the combination of means for sewing a button onto a fabric, and means for winding a thread around the neck of thread securing the button to the fabric, substantially as described.

125. In a button-sewing machine, the combination of means for holding the button at a definite distance from the fabric to which it is to be secured, winding mechanism, and means for holding the winding mechanism out of operation when desired, substantially as described.

126. In a button-sewing machine, the combination of sewing mechanism, mechanism for winding a thread around the sewing-thread, and means for holding the winding mechanism out of operation when desired, substantially as described.

127. In a button-sewing machine, the combination of sewing mechanism, winding mechanism, and connections whereby the winding mechanism is prevented from operation until the sewing mechanism has performed its allotted work, substantially as described.

128. In a button-sewing machine, the combination of sewing mechanism, winding mechanism, and means for preventing the operation of either of said mechanisms until the other mechanism has performed its allotted work, substantially as described.

129. In a button-sewing machine, the combination of sewing mechanism, winding mechanism, driving means for said sewing mechanism and driving mechanism, said driving means operating constantly, and means for automatically shifting said driving means when the required number of stitches has been made to stop the sewing mechanism and put the winding mechanism into operation, substantially as described.

130. In a button-sewing machine, the combination of sewing mechanism, winding mechanism, and constantly-running driving means, said means being adapted to be placed in any one of three positions, namely, a neutral position in which neither of said mechanisms is driven, a position to operate the sewing mechanism, and a position to operate the winding mechanism, substantially as described.

131. In a button-sewing machine, the combination of sewing mechanism, winding mechanism, constantly-running driving means therefor, and shifting mechanism whereby said sewing mechanism and said winding mechanism are operated in succession, substantially as described.

132. In a button-sewing machine, the combination of sewing mechanism, winding mechanism, and constantly-running driving means therefor, said driving means being adapted to be clutched alternately with the sewing mechanism and the winding mechanism, substantially as described.

133. In a button-sewing machine, the combination of winding mechanism, sewing mechanism, continuously-running driving means therefor, and means for locking said sewing mechanism against operation after a given number of stitches has been made thereby, substantially as described.

134. In a button-sewing machine, the combination of winding mechanism, continuously-running driving means therefor, and means for locking said winding mechanism against operation after the desired number of turns has been given thereto, substantially as described.

135. In a button-sewing machine, the combination of means for holding a button at a definite distance from the fabric to which it is to be secured, sewing mechanism, and winding mechanism for winding a thread around the neck of thread securing the button to the fabric, substantially as described.

136. In a button-sewing machine, the combination of sewing mechanism, winding mechanism, and automatically-operated locks whereby the operation of either of said mechanisms is prevented until the other mechanism has completed its allotted work in sewing on a button, substantially as described.

137. In a button-sewing machine, the combination of means for holding a button at a definite distance from the fabric to which it is to be secured, sewing mechanism, winding mechanism, and means for throwing said winding mechanism out of operation when desired, substantially as described.

138. In a button-sewing machine, the combination of sewing mechanism, winding mechanism, constantly-running driving means for said mechanism, means for shifting said driving means to drive the sewing mechanism and winding mechanism alternately, and means operated by said shifting means for locking the winding mechanism while the sewing mechanism is in operation and vice versa, substantially as described.

139. In a button-sewing machine, the combination of sewing mechanism, means for holding a fabric, means for holding a button, said button-holding means being spaced both from the fabric and from the fabric-holding means, whereby the button when sewed on is spaced from the fabric by an extended neck of thread, and adjustable means for varying the number of stitches passed through a button by said sewing mechanism, substantially as described.

140. In a button-sewing machine, the combination of sewing mechanism, means for holding a fabric, means for holding a button, said button-holding means being spaced both from the fabric and from the fabric-holding means, whereby the button when sewed on is spaced from the fabric by an extended neck of thread, adjustable means for varying the total number of stitches passed through a button, and automatic means for shifting said button when half of said number of stitches has been made, substantially as described.

141. In a button-sewing machine, the combination of winding mechanism, sewing mechanism, means for holding a button at a definite distance from the fabric to which it is to be secured, and means for automatically stopping the operation of said sewing mechanism when the required number of stitches has been made, substantially as described.

142. In a button-sewing machine, the combination of winding mechanism, sewing mechanism, means for automatically stopping the operation of said sewing mechanism when the required number of stitches has been made, and means for locking said sewing mechanism against operation when the required number of stitches has been made, substantially as described.

143. In a button-sewing machine, the combination of sewing mechanism, means for holding a fabric, means for holding a button, said button-holding means being spaced both from the fabric and from the fabric-holding means, whereby the button when sewed on is spaced from the fabric by an extended neck of thread, adjustable means for determining the number of stitches made by said sewing mechanism at one operation, and means for starting said sewing mechanism, substantially as described.

144. In a button-sewing machine, the combination of sewing mechanism, winding mechanism, continuously-running driving means for said mechanisms, and means for automatically shifting said driving means from the position where it is connected to the sewing mechanism to the position where it is connected to the winding mechanism when the requisite number of stitches has been made by the sewing mechanism, substantially as described.

145. In a button-sewing machine, the combination of sewing mechanism, winding mechanism, constantly-running driving means therefor, and means for shifting said driving means into a neutral position as soon as the winding mechanism has finished its allotted work in securing a button to the fabric, substantially as described.

146. In a button-sewing machine, the combination of sewing mechanism, winding mechanism, constantly-running driving means therefor, means for locking said sewing mechanism and said winding mechanism, and means for shifting said driving means, whereby the sewing mechanism is locked when the winding mechanism is operated and vice versa, substantially as described.

147. In a button-sewing machine, the combination of sewing mechanism, constantly-running driving means therefor, winding mechanism, a lock therefor, and means for shifting the driving means into operative connection with the sewing mechanism, said means also serving to lock said winding mechanism, substantially as described.

148. In a button-sewing machine, the combination of sewing mechanism, winding mechanism, continuously-running driving means therefor, a lock for said sewing mechanism, and means for shifting said driving means into operative relation with said winding mechanism, said means also serving to lock the sewing mechanism, substantially as described.

149. In a button-sewing machine, the combination of sewing mechanism, winding mechanism, continuously-running driving means therefor, with means for shifting said driving means into operative relation with either said sewing mechanism or said winding mechanism, said shifting means also operating to positively lock the one of said mechanisms which is out of operative relation with said driving means, substantially as described.

150. In a button-sewing machine, the combination of sewing mechanism, winding mechanism, constantly-running driving means therefor, a lock for said winding mechanism, means for shifting said driving means into operative relation with said sewing mechanism, said shifting means also operating upon said lock to lock said winding mechanism against operation, and means for holding said winding mechanism with said lock, thereby rendering it inoperative, substantially as described.

151. In a button-sewing machine, the combination of sewing mechanism, winding mechanism, constantly-running driving means therefor, a lock for said sewing mechanism, means for varying the number of stitches made by said sewing mechanism, and means for shifting said driving means into operative relation with said winding mechanism, said means also serving to operate said lock and prevent the operation of said sewing mechanism, substantially as described.

152. In a button-sewing machine, the combination of sewing mechanism, winding mechanism, constantly-running driving means therefor, a lock for said winding mechanism, and means for shifting said driving means into operative relation with said sewing mechanism, and simultaneously locking said winding mechanism against operation, said means consisting of a shifting yoke engaging said driving mechanism, and connections between said yoke and said lock, substantially as described.

153. In a button-sewing machine, the combination of sewing mechanism, winding mechanism, constantly-running driving means therefor, a lock for said sewing mechanism, means for shifting said driving means into operative relation with said winding mechanism, and simultaneously operating said lock to prevent the operation of said sewing mechanism, said means including a swinging yoke and connections between said yoke and said lock, substantially as described.

154. In a button-sewing machine, the combination of sewing mechanism, winding mechanism, and a locking device for said mechanisms, said locking device being so arranged that it may engage with one of said mechanisms, but not with both, whereby said mechanisms may be operated alternately but not at the same time, substantially as described.

155. In a button-sewing machine, a locking device for the winding mechanism and sewing mechanism thereof, said locking device consisting of two shafts with a clutch mounted on each shaft, each of said clutches being provided with a recess, spring-operated plates adapted to engage said recesses, and a single bar connecting said plates, the parts being so arranged that one of said shafts is locked while the other is free to rotate and vice versa, substantially as described.

156. In a button-sewing machine, the combination of a driving-shaft for the sewing mechanism, a clutch fastened thereto, and provided with an inclined face and a recess, a driving-shaft for the winding mechanism, a clutch fastened thereto provided with an inclined face and a recess, plates adapted to engage said recesses, a bar connecting said plates, and a single spring around said bar adapted to act on each of said plates, substantially as described.

157. In a button-sewing machine, the combination of sewing mechanism, a shaft, a constantly-running pulley thereon, and means for shifting said pulley, said means including a lever partially surrounding said shaft, a switch-cam connected to said lever, and a yoke operated by said switch-cam, and engaging said pulley, substantially as described.

158. In a button-sewing machine, the combination of sewing mechanism, winding mechanism, a constantly-running pulley, and means for shifting said pulley to drive either said sewing mechanism or said winding mechanism, means actuated by the operator for shifting said driving means into operative relation with said sewing mechanism, and means for automatically shifting said pulley into operative relation with said winding mechanism when the required number of stitches has been made by the sewing mechanism, substantially as described.

159. In a button-sewing machine, the combination of sewing mechanism, a main shaft, a constantly-running loose pulley on said shaft, and means for shifting said pulley, said means consisting of a lever and a switch-cam carried thereby, said lever and said cam together encircling said shaft, a swinging yoke engaging said pulley and said cam, and means for vibrating said lever, substantially as described.

160. In a button-sewing machine, the combination of sewing mechanism, a driving-shaft therefor, constantly-running driving means for said shaft, a lever and switch-cam surrounding said shaft, means operated by said switch-cam for moving said driving means into operative relation with said shaft, and automatic means operated when the required number of stitches have been made by the sewing mechanism for shifting said driving means out of operative relation with said shaft, substantially as described.

161. In a button-sewing machine, the combination of sewing mechanism, winding mechanism, constantly-running driving means therefor, means actuated by the operator for throwing said driving means into operative relation with said sewing mechanism, an automatically-operated shifting means whereby after the sewing-machine is started, the winding mechanism is locked out of operation until the required number of stitches has been made by the sewing mechanism, and the winding mechanism is then thrown into operation, and the parts restored to their original neutral position when the winding mechanism has finished its alloted work, substantially as described.

162. In a button-sewing machine, the combination of sewing mechanism, a driving-shaft therefor, a constantly-running pulley loosely mounted on said driving-shaft, a winding mechanism, a pulley thereon, a second loose pulley on said driving-shaft, a belt connecting said second loose pulley with the pulley on the shaft of the winding mechanism, and means for shifting said driving-pulley into the three following positions in succession: the first in operative relation with the sewing mechanism, the second in operative relation with the winding mechanism, and the third in a neutral position, substantially as described.

163. In a button-sewing machine, the combination of winding mechanism, including a shaft carrying a pulley fixed thereto, a constantly-running driving-pulley, and means for automatically connecting said driving-pulley with the pulley on the shaft of the winding mechanism at a certain time during the operation of sewing on the button, substantially as described.

164. In a button-sewing machine, the combination of sewing mechanism, a driving-shaft therefor, a constantly-running pulley loosely mounted on said shaft, a clutch on said shaft, means actuated by the operator for throwing said pulley into engagement with said shaft, said means including a pivoted yoke and a lever and switch-cam together encircling said shaft, said yoke engaging said lever, and means for temporarily locking said pulley and clutch in engagement with each other, substantially as described.

165. In a button-sewing machine, the combination of sewing mechanism, an intermittently-running driving-shaft therefor, a constantly-running pulley mounted on said shaft, a clutch on said shaft, and means actuated by the operator for moving said pulley into engagement with said clutch, said means including a treadle, a swinging lever operated by said treadle, an arm engaging said lever, a shaft to which said arm is fastened, a lever and switch-cam fastened to said last-named shaft and encircling the driving-shaft of said sewing mechanism, and a swinging yoke engaging said loose pulley and said switch-cam, substantially as described.

166. In a button-sewing machine, the combination of sewing mechanism, winding mechanism, constantly-running driving means therefor, means actuated by the operator for throwing said driving means into operative relation with said sewing mechanism, and means actuated by the operation of the machine for automatically shifting said driving means into operative relation with said winding mechanism, and afterward into a neutral position, substantially as described.

167. In a button-sewing machine, the combination of sewing mechanism, means for varying the number of stitches made by said sewing mechanism in the operation of sewing on a button, a driving-shaft therefor, constantly-running driving means, a clutch on said shaft, means actuated by the operator for throwing said driving means into engagement with said clutch, said means including a treadle, a lever connected thereto, an arm engaging said lever, a shaft to which said arm is secured, a lever mounted on said second-named shaft, a switch-cam carried by said lever, said second lever and shaft encircling said driving-shaft, and a swinging yoke provided with pins, said pins engaging said cam and said driving means, substantially as described.

168. In a button-sewing machine, the combination of winding mechanism, constantly-running driving means therefor, means normally actuated by the action of the machine to shift said driving mechanism into engagement with said winding mechanism, and means for preventing such shifting action when desired, thereby rendering said winding mechanism inoperative, substantially as described.

169. In a button-sewing machine, the combination of winding mechanism, constantly-running driving means therefor, a lever and switch-cam for moving said driving means into engagement with said winding mechanism, and means for causing said switch-cam to prevent said movement, thereby rendering said winding mechanism inoperative, substantially as described.

170. In a button-sewing machine, the combination of a main shaft, a constantly-running driving-pulley thereon, winding mechanism, a lever and switch-cam for shifting said pulley into engagement with said winding mechanism, said switch-cam being provided with a spring-actuated switch, and means operated by the movement of said lever to move said switch, thereby preventing the shifting of a pulley into engagement with said winding mechanism and rendering said winding mechanism inoperative, substantially as described.

171. In a button-sewing machine, the combination of a main shaft, a constantly-running driving-pulley loosely mounted thereon, winding mechanism, a lever and switch-cam encircling said shaft, said switch-cam being provided with a movable switch, means for stopping said lever in such a position that the driving-pulley will be in engagement with the winding mechanism, said means including a stop, and a spring-actuated arm adapted to engage said stop, and means for moving aside said arm actuating the switch in said cam so that said driving-pulley will not be thrown into engagement with said winding mechanism by the action of the machine, substantially as described.

172. In a button-sewing machine, the combination of winding mechanism a switch-cam, said cam being provided with a straight and inclined slots, a switch mounted therein, a spring controlling the action of said switch, a lever controlled by said spring, and an adjustable pin supported by the bed-plate, said pin being adapted to be adjusted so that said lever will strike it on the movement of said switch-cam, and shift said switch at the proper time, the parts named being adapted to render the winding mechanism inoperative when so adjusted, substantially as described.

173. In a button-sewing machine, the combination of winding mechanism, constantly-running driving means therefor, means for normally shifting said driving means into engagement with said winding mechanism to drive the latter, said means including a lever and a switch-cam encircling said shaft, a stop on said lever, a spring-actuated swinging plate adapted to engage said stop in the ordinary operation of the machine, and means for moving aside said plate and operating the switch in said cam, thereby preventing the operation of the winding mechanism, substantially as described.

174. In a button-sewing machine, the combination of a main shaft, a constantly-running driving-pulley loosely mounted thereon, winding mechanism, including a driving-shaft therefor, provided with an index-screw, means for shifting said pulley so that it will drive the driving-shaft of said winding mechanism, said means including a lever, and switch-cam surrounding said main shaft, and said switch-cam being provided with a movable switch, a stop on said lever, a spring-actuated plate adapted to engage said stop at intervals in the ordinary operation of the machine, an index-pin adapted to engage said index-screw, and an adjustable support therefor, said support being adapted when in a certain position to move aside said plate, and prevent said stop from striking it in the operation of the machine, the adjustment of said support also serving to turn the switch in said cam at the proper time, thereby preventing the driving-pulley from being thrown into engagement with the winding mechanism, substantially as described.

175. In a button-sewing machine, the combination of a main shaft, a constantly-running driving-pulley loosely mounted thereon, winding mechanism, a driving-shaft therefor, provided with an index-screw, means for shifting said pulley, including a lever, provided with a stop and a switch-cam provided with a movable switch, a spring-actuated plate adapted to be struck by said stop in the ordinary operation of the machine, an arm carrying an index-pin adapted to engage with said index-screw, and means for adjusting said arm so that it will force aside said spring-actuated plate into a position where said plate will not be struck by the stop mounted on said lever, a pin moved by the movement of said plate, and devices whereby upon the movement of said switch-cam the switch in said cam will be operated by said pin, moving said switch so that it will prevent the shifting of said driving-pulley into operative relation with the driving-shaft of the winding mechanism, substantially as described.

176. In a button-sewing machine, the combination of winding mechanism, a switch-cam provided with a straight and with inclined slots, an angular switch whose movement is limited by the walls of said slots, a pin supporting said switch, a spring surrounding said spring, and regulating the action of said switch except when the latter is forcibly moved against the tension of said spring, a support for said spring, a bell-crank lever carried by said support and engaging said spring, and means adapted to be adjusted in the path of movement of said bell-crank lever, thereby causing said lever to throw said switch into a position which will prevent the actuation of the winding mechanism, substantially as described.

177. In a button-sewing machine, the combination of winding mechanism, a switch-cam, provided with a straight slot and with inclined slots, an angular switch carried by said cam, the movement of said switch being limited by the walls of said slots, and the normal position of said switch being such that the arms thereof form extensions of the walls of two of the slots in said cam, a pin on which said switch is mounted, a support for said pin secured to said switch, a spring attached at one end to said support and surrounding said pin, a second support mounted on said first-named support, a bell-crank lever carried by said second support, one arm of said lever being adapted to engage said pin, and said lever being provided with a stop against which one end of said spring bears, and means supported on the bed-plate which may be adjusted to strike one arm of said bell-crank lever as said switch-cam is moved, thereby throwing said switch at the proper time to render the winding mechanism inoperative, substantially as described.

178. In a button-sewing machine, the combination of a main shaft, a constantly-running driving-pulley loosely mounted thereon, winding mechanism including a shaft, provided with an index-screw, means for shifting said pulley so that it will drive said winding mechanism, said means including a movable lever and a slotted cam, provided with a switch carried by said lever, a stop on said lever, a spring-actuated plate adapted to engage said stop in the ordinary operation of the machine, an arm fastened to said lever, a pin pivoted to said arm, and means carried by said switch-cam adapted to strike said pin as the switch-cam is moved and throw the switch, thereby preventing said pulley from being shifted so that it will drive said winding mechanism, substantially as described.

179. In a button-sewing machine, the combination of a main shaft, a constantly-running driving-pulley loosely mounted thereon, winding mechanism, means for shifting said pulley to drive said winding mechanism, said means including a lever, and a switch-cam carried by said lever, said lever and cam encircling said main shaft, a stop carried by said lever, and a spring-actuated plate adapted to engage said stop and arrest the movement of said lever at the time when the driving-pulley has been shifted so that it will drive said winding mechanism, substantially as described.

180. In a button-sewing machine, the combination of a main shaft, a constantly-running driving-pulley loosely mounted thereon, winding mechanism, including a driving-shaft therefor, a pulley fastened to said last-named shaft, a loose pulley provided with a projection mounted on said main shaft, a belt connecting said last-named pulley with the pulley on the shaft of the winding mechanism, a projection on said driving-pulley, and means for shifting said driving-pulley into clutched engagement with the loose pulley on the main shaft, said means including a lever, a switch-cam carried thereby, said lever and cam surrounding said main shaft, and a pivoted yoke, provided with pins engaging said driving-pulley and said switch-cam, substantially as described.

181. In a button-sewing machine, the combination of a main shaft, a constantly-running driving-pulley loosely mounted thereon, a loose pulley on said shaft, both of said pulleys being provided with projections, winding mechanism, a driving-shaft therefor, a pulley fastened to said last-named shaft, a belt connecting said pulley with one of the loose pulleys on the main shaft, a lock for the driving-shaft of the winding mechanism, and means for shifting the driving-pulley into engagement with the loose pulley on the main shaft, said means including a lever, a slotted switch-cam carried by said lever, and a swinging yoke, provided with pins engaging said driving-pulley and the slots in said switch, the movement of said yoke serving at the same time to unlock the driving-shaft of the winding mechanism, substantially as described.

182. In a button-sewing machine, the combination of a main shaft, a constantly-running driving-pulley loosely mounted thereon, a second loose pulley on said shaft, winding mechanism, a driving-shaft for said mechanism, a pulley fastened to said shaft, a belt connecting said last-named pulley with said second pulley, a locking-cam, provided with a depression, fastened to the driving-shaft of the winding mechanism, a spring-actuated plate adapted to engage said depression and lock the driving-shaft of the winding mechanism, and means for shifting said driving-pulley into engagement with the other loose pulley on the main shaft and for simultaneously unlocking the driving-shaft of the winding mechanism, said means including a lever, provided with a stop, a switch-cam carried by said lever, a spring-actuated plate adapted to engage said stop on said lever, a pivoted yoke, provided with pins engaging said driving-pulley and said switch-cam, said yoke being provided with an arm at right angles thereto, a bar pivoted to said arm, and a plate pivoted to said bar, to which plate is attached the spring-plate for locking said driving-shaft of the winding mechanism, substantially as described.

183. In a button-sewing machine, the combination of a main shaft, a constantly-running driving-pulley loosely mounted thereon, winding mechanism, a second pulley loosely mounted on said main shaft for driving said winding mechanism, a driving-shaft for said winding mechanism, a locking-cam fastened to said last-named shaft and provided with a depression, a spring-actuated plate adapted to engage said depression at certain times, and thereby lock said winding mechanism against operation, means for shifting the driving-pulley on the main shaft, said means including a movable lever and a slotted cam, provided with a switch, carried by said lever, a pivoted yoke, provided with pins engaging said cam and said driving-pulley, said yoke being provided with an extending arm, connections including a spring between said arm and said plate, said arm being normally adapted at certain times to disengage said plate from said depression, thereby unlocking the driving-shaft of the winding mechanism, and means for shortening the normal movement of said arm, thereby preventing the movement of said spring-pressed plate to unlock the driving-shaft of the winding mechanism, thus rendering said winding mechanism inoperative, substantially as described.

184. In a button-sewing machine, the combination of winding mechanism, a main shaft, a constantly-running driving-pulley loosely mounted thereon, a second pulley loosely mounted on said shaft and adapted when clutched with the driving-pulley to drive the winding mechanism, a driving-shaft for the winding mechanism connected with said second-named loose pulley, an index-screw carried by the driving-shaft of the winding mechanism, an index-pin adapted to engage with said index-screw, an arm supporting said pin and provided with apertures, and a second arm, provided with a pin adapted to engage in one of said apertures, whereby by adjusting said arms with relation to each other, the number of turns of the driving-shaft of the winding mechanism may be varied from zero to any desired number, substantially as described.

185. In a button-sewing machine, the combination of a main shaft, a constantly-running driving-pulley loosely mounted thereon, a second pulley for the winding mechanism loosely mounted on said shaft, said driving-pulley being adapted to be shifted with said second-named pulley at the proper time, winding mechanism, a driving-shaft therefor, provided with an index-screw, a locking-cam on said last-named shaft, provided with a depression, a spring-actuated locking-plate adapted to engage said depression, means for shifting said driving-pulley into engagement with said second pulley, said means including a pivoted lever, a slotted cam provided with a switch carried by said lever, and a pivoted yoke provided with pins engaging said driving-pulley and said switch-cam, an arm carried by said yoke, connections between said arm and the spring-pressed locking-plate for the driving-shaft of the winding mechanism, an index-screw on the driving-shaft of said winding mechanism, an arm provided with an index-pin adapted to be brought into engagement with said screw, a pin supporting said arm, a second arm mounted on the same supporting-pin in adjustable relation to said first-named arm, whereby the number of turns of the winding mechanism may be varied, a projection mounted on said second-named arm, a spring-pressed plate adapted to be engaged by said projection and moved aside, a a stop on said lever, adapted to strike said spring-pressed plate, a pivoted support for the pin, carrying index-arms, an extending arm made integrally, and a projection carried by said lever adapted to strike said projecting arm and move said index-pin out of engagement with said index-screw, substantially as described.

186. In a button-sewing machine, the combination of a button-chuck, provided with adjustable jaws, and a spring-jaw, means for adjusting said chuck toward and away from the fabric to which the button is to be secured, a support for said chuck, winding mechanism carried by said support, sewing mechanism, means for adjusting the number of stitches made by said sewing mechanism, means for starting the machine adapted to be actuated by the operator, means for locking said starting means in position until the sewing mechanism has made the required number of stitches, constantly-running driving means, said driving means being adapted to alternately drive the sewing mechanism and winding mechanism, means for varying the number of turns of the winding mechanism, and locking means for said sewing mechanism and for said winding mechanism, said locking means being arranged upon a single bar, and being so related to each other, that the shifting of the driving means to drive said sewing mechanism will unlock said sewing mechanism and lock said winding mechanism, and that the shifting of the driving means to drive the winding mechanism will unlock said winding mechanism and lock said sewing mechanism, substantially as described.

187. In a button-sewing machine, the combination of mechanism for holding a button at a definite distance above the fabric to which it is to be secured, means for operating said button-holding mechanism so that the fabric may be put in position on the machine and a button held above said fabric-sewing mechanism, means for starting said sewing mechanism, and means whereby the operation of the starting mechanism will prevent the operation of the button-holding means, substantially as described.

188. In a button-sewing machine, the combination of means for holding a button at a definite distance above the fabric to which it is to be secured, means for operating said button-holding means, sewing mechanism, means for starting said sewing mechanism, and connections whereby the movement of the button-holding means will prevent the operation of the means for starting the sewing mechanism, substantially as described.

189. In a button-sewing machine, the combination of mechanism for holding a button at a definite distance above the fabric to which it is to be secured, a treadle and connections for operating said button-holding mechanism from said treadle, sewing mechanism, a second treadle, and connections whereby the operation of said second treadle starts said sewing mechanism, a rock-shaft provided with projecting levers, one for each treadle, and connections between said treadles and said rock-shaft, whereby the operation of either of said treadles prevents the operation of the other, substantially as described.

190. In a button-sewing machine, the combination of sewing mechanism, winding mechanism, means for starting said sewing mechanism, and devices whereby the operation of the starting mechanism prevents the operation of the winding mechanism until the sewing mechanism has finished its work, driving means for said sewing mechanism and said winding means, and automatic shifting means for shifting said driving means from operative relation with the sewing mechanism to operative relation with the winding mechanism after a button has been sewed on, substantially as described.

191. In a button-sewing machine, the combination of movable button-holding means, sewing mechanism, means for starting said sewing mechanism, and connections whereby the movement of the button-holding means will prevent the operation of said starting means, substantially as described.

192. In a button-sewing machine, the combination of means for holding the fabric, means for holding a button, and devices for adjusting said button-holding means toward or away from said fabric-holding means, substantially as described.

In testimony whereof I affix my signature in presence of two witnesses.

J. W. DARLEY, JR.

Witnesses:
 W. E. MESSERSMITH,
 M. COHN.